(12) United States Patent
Bikson et al.

(10) Patent No.: US 12,378,491 B1
(45) Date of Patent: Aug. 5, 2025

(54) SYSTEM AND METHOD FOR PRODUCING RENEWABLE NATURAL GAS FROM BIOGAS

(71) Applicant: Unconventional Gas Solutions, LLC, Houston, TX (US)

(72) Inventors: Benjamin Bikson, Newton, MA (US); Marc Straub, Cypress, TX (US)

(73) Assignee: Unconventional Gas Solutions, LLC, Houston, TX (US)

( * ) Notice: Subject to any disclaimer, the term of this patent is extended or adjusted under 35 U.S.C. 154(b) by 0 days.

(21) Appl. No.: 19/081,490

(22) Filed: Mar. 17, 2025

Related U.S. Application Data

(63) Continuation-in-part of application No. 18/910,756, filed on Oct. 9, 2024, which is a continuation of
(Continued)

(51) Int. Cl.
*B01D 53/22* (2006.01)
*B01D 53/00* (2006.01)
(Continued)

(52) U.S. Cl.
CPC ............ *C10L 3/104* (2013.01); *B01D 53/002* (2013.01); *B01D 53/02* (2013.01); *B01D 53/225* (2013.01); *B01D 53/226* (2013.01); *B01D 53/229* (2013.01); *B01D 53/62* (2013.01); *C10L 3/103* (2013.01); *B01D 2256/245* (2013.01);
(Continued)

(58) Field of Classification Search
CPC ....... C10L 3/104; C10L 3/103; B01D 53/002; B01D 53/02; B01D 53/229; B01D 53/22; B01D 53/223; B01D 53/224; B01D 53/225; B01D 53/226; B01D 53/228; B01D 2256/245; B01D 2257/102;
(Continued)

(56) References Cited

U.S. PATENT DOCUMENTS 5,401,300 A 3/1995 Lokhandwala et al.
6,630,011 B1 10/2003 Baker et al.
(Continued)

FOREIGN PATENT DOCUMENTS

EP 3446771 B1 3/2010
WO WO2022012944 A1 1/2022

OTHER PUBLICATIONS

Anjan K. Datta et al., "Optimization of membrane unit for removing carbon dioxide from natural gas"; Journal of Membrane Science 283 (2006) 291-300.
(Continued)

*Primary Examiner* — Frank M Lawrence, Jr.
(74) *Attorney, Agent, or Firm* — Forge IP, PLLC

(57) ABSTRACT

An improved method and apparatus for removing acid gases and other impurities from raw biogas streams, such as biogas from landfills or biogas from controlled anaerobic digestion, is disclosed. The method provides efficient generation of high-purity renewable natural gas from raw biogas. The biogas is treated in a multi-stage membrane system integrated with compression equipment. The membrane separation stages are integrated with high-pressure and low-pressure compressors with the low-pressure compressor operating in a defined pressure range. The combined system provides for efficient contaminant removal from raw biogas to generate high-purity methane products with reduced membrane area and compression energy consumption.

63 Claims, 9 Drawing Sheets

Related U.S. Application Data application No. 18/766,045, filed on Jul. 8, 2024, now Pat. No. 12,139,682.

(51) Int. Cl.
*B01D 53/02* (2006.01)
*B01D 53/62* (2006.01)
*C10L 3/10* (2006.01)

(52) U.S. Cl.
CPC .. *B01D 2257/102* (2013.01); *B01D 2257/104* (2013.01); *B01D 2257/304* (2013.01); *B01D 2257/504* (2013.01); *B01D 2257/708* (2013.01); *B01D 2257/80* (2013.01)

(58) Field of Classification Search
CPC ........ B01D 2257/104; B01D 2257/304; B01D 2257/504; B01D 2257/708; B01D 2257/80
USPC .... 96/4, 7–10, 14; 95/43, 45, 49, 51, 52, 54
See application file for complete search history.

(56) References Cited

U.S. PATENT DOCUMENTS

| | | |
|---|---|---|
| 8,211,211 B1 | 7/2012 | Knaebel |
| 8,999,038 B2 | 4/2015 | Ungerank et al. |
| 9,770,687 B2 | 9/2017 | Ungerank et al. |
| 9,988,326 B2 | 6/2018 | Paget et al. |
| 10,471,380 B2 | 11/2019 | Priske |
| 10,569,217 B2 | 2/2020 | Mitariten |
| 10,589,215 B2 | 3/2020 | Ding et al. |
| 10,780,392 B2 | 9/2020 | Bikson et al. |
| 11,498,026 B2 | 11/2022 | Wu et al. |
| 11,980,846 B1 | 5/2024 | Bikson |
| 2007/0272079 A1 | 11/2007 | Malsam et al. |
| 2017/0283292 A1 | 10/2017 | Kim |
| 2018/0250627 A1 | 9/2018 | Zick et al. |
| 2018/0339264 A1 | 11/2018 | Fukuda et al. |
| 2019/0060835 A1 | 2/2019 | Ding et al. |
| 2019/0224617 A1 | 7/2019 | Mitariten |
| 2020/0179868 A1 | 6/2020 | Ding |
| 2022/0203294 A1 | 6/2022 | Myrick |
| 2022/0219978 A1 | 7/2022 | Tewari et al. |
| 2022/0297055 A1 | 9/2022 | Barraud |

OTHER PUBLICATIONS

A. Makaruk et al. "Membrane biogas upgrading processes for the production of natural gas substitute"; Separation and Purification Technology 74 (2010) pp. 83-92.

M. Scholz et al. "Structural optimization of membrane-based biogas upgrading processes"; Journal of Membrane Science 474 (2015) 1-10.

SYSTEM AND METHOD FOR PRODUCING RENEWABLE NATURAL GAS FROM BIOGAS

FIELD OF THE INVENTION

This invention relates to a system and method for removing impurities from a range of biogas streams by a mutistage membrane gas separation process integrated with compression equipment.

BACKGROUND OF THE INVENTION

Methane is one of the main components of the primary energy sources used in the world. Much of the raw methane-containing gas sources are "subquality," that is, the raw gas exceeds pipeline specifications in nitrogen, oxygen, carbon dioxide, and/or hydrogen sulfide concentration. The gas must be treated to meet pipeline specifications, liquified, or otherwise utilized. Renewable natural gas (RNG) generated from biogas is an emerging alternative energy source comprised of methane.

Biogas is obtained by a complex degradation process of organic matter performed by a set of bacteria under mostly anaerobic conditions. The biogas can get contaminated with atmospheric air, to some degree affecting gas composition. Biogas is produced from organic materials in plants ranging from sewage treatment plants to organic waste utilization in landfill sites to farm biogas production that utilizes ecologically pure crops and manure. The resulting gas consists primarily of methane and carbon dioxide together with smaller amounts of other gases and vapors, such as hydrogen sulfide, ammonia, volatile organic compounds (VOCs), oxygen, nitrogen, and additionally of siloxanes for landfill gas. As shown by a considerable number of biogas plants, biogas production and utilization can result in additional available energy with reduced emission of methane and carbon dioxide to the atmosphere and the production of valuable fertilizer. Several biogas utilization methods can be applied. Presently, the most popular approach is the production of combined heat and power (CHP) by means of internal combustion engines. The CHP process can be deployed if heat consumers are in the vicinity of the plant. However, this requirement cannot be met in most cases. As a result, the excess heat energy is frequently vented into the atmosphere, lowering the overall energy production efficiency and requiring additional electrical power for heat removal. The biogas upgrading to pipeline natural gas quality avoids this shortcoming and generates renewable natural gas (RNG). The upgraded biogas is in the form of a natural gas substitute and can be injected into existent natural gas grids or used as a vehicle fuel using the natural gas infrastructure. The upgraded biogas can be distributed at a low cost and utilized with higher efficiency by customers. However, to generate renewable natural gas, the raw biogas must be upgraded to the customer's specification by removing multiple impurities, where the largest volumetric component is carbon dioxide, with other key impurities including hydrogen sulfide and oxygen.

Biogas contains a variable, but high, carbon dioxide content from 25 to 60 volumetric percent. The $H_2S$ concentration in the biogas usually ranges from 10 to 5,000 ppmv but can reach up to 30,000 ppmv (3% v/v) in some cases. To be used as a source of energy to generate heat and electricity or as a renewable natural gas, biogas must be cleaned ($H_2S$ and siloxane removed) and upgraded ($CO_2$ removed to product specification). The raw biogas can further contain oxygen in variable amounts that can require removal to meet pipeline specification and a significant amount of nitrogen that may require removal as well to meet pipeline specification for the total inert component.

A large fraction of the raw biogas gas streams exceeds the typical acid gas pipeline specification for carbon dioxide of no more than 2% and for hydrogen sulfide below 4 ppm. Since the feed gas may contain other sulfur-based compounds and inert gas nitrogen, the pipeline natural gas typically must contain 0.5 grains of total sulfur or less per 100 cubic feet of gas with total non-hydrocarbons of 5% or less. Before biogas can be sent to the supply pipeline, the carbon dioxide and hydrogen sulfide content must be reduced. Various techniques for acid gas removal, including absorption into an amine solution, cryogenic separation, adsorption, and membrane separation, have been used in the industry. Each has its advantages and disadvantages. It is also known to use a combination of these unit separation processes for acid gas removal.

Methods heretofore known for the purification of biogas, in particular, carbon dioxide gas removal, may be divided roughly into the following classifications:

(a) Methods involving absorption separation unit operations, wherein water and, in particular, amine absorbent-based water solutions or physical solvents are utilized as an absorption media.

(b) Methods involving membrane separation unit operations, wherein the carbon dioxide is removed by preferential permeation through a polymeric membrane.

(c) Methods involving adsorption unit separation operations, wherein the carbon dioxide is removed by a thermal or pressure swing adsorption process. The most common adsorbent is activated carbon but other adsorbents, including zeolites, such as zeolite 5A, molecular sieve carbons, silica gel, activated alumina, or other adsorbents selective for carbon dioxide over methane are utilized as well.

(d) Methods involving liquefaction and cryogenic distillation are utilized when products in a liquified form are desired.

Membrane processes for biogas upgrading have been reviewed by A. Makaruk et al. in Separation and Purification Technology 74 (2010) pp. 83-92.

Membrane separation units remove carbon dioxide by selective permeation of $CO_2$ from high pressure to low pressure across a polymeric membrane. Membrane systems have numerous attractive features, such as intrinsic simplicity, the lack of cyclic valve switching, and the ability to generate dry biomethane at elevated pressure. Polymeric membranes can lose treating capacity over time due to exposure to contaminants, such as heavy hydrocarbons, and adsorption processes are commonly used as a pretreatment for the removal of water, heavy hydrocarbons, and other contaminants. The intrinsic simplicity of membrane gas separation processes make them attractive for biogas processing to produce renewable natural gas. However, the efficient removal of carbon dioxide from raw biogas streams with a high methane product recovery and a high product purity by membrane processes requires staging. The membrane staging configuration must be optimized toward the specific application. Optimization of membrane separation units for removing carbon dioxide from natural gas is reviewed by Anjan K. Datta et al. in the Journal of Membrane Science 283 (2006) 291-300. Optimization of multistage membrane processes for the purification of biogas is reported by M. Scholz et al. in the Journal of Membrane Science 474 (2015) 1-10.

To generate pipeline specification RNG combined with high methane recovery from raw biogas by a membrane process requires extensive staging. Muti-stage membrane systems with extensive permeate gas recycling are required for high methane recovery. Several muti-stage membrane separation systems for raw biogas purification are disclosed in the art including in U.S. Pat. Nos. 11,498,026; 10,780,392; 10,589,215; 10,569,217; 10,471,380; 9,988,326; 9,770,687; U.S. Patent Application Publication Nos. US 2022/0297055 A1; US 2018/0250627 A1; US 2017/0283292 A1; European Patent Specification EP 3 446 771 B1, and international patent publication WO 2022/012944 A1. A three-stage membrane process for generating high-purity biomethane combined with high recovery from raw biogas is disclosed in U.S. Pat. No. 8,999,038. However, there is a disadvantage connected with a high flow of recycled permeated gas that leads to increase in compressor capacity and power consumption. To generate RNG with carbon dioxide concentrations as low as 0.1% mole, a state-of-the-art multi-stage membrane system with a high 99.5% methane recovery, an increase of more than 60% in compressor capacity, is required for the feed raw biogas compression.

It is known to utilize membranes with tailored acid gas removal characteristics, such as $H_2S/CH_4$ gas separation characteristics, in biogas treatment. Y. Ding and M. Mitariten, in U.S. Patent Application Publication No. US 2020/0179868 A1, disclose a biogas treatment process that removes carbon dioxide and hydrogen sulfide from the biogas to generate pipeline specification RNG. Multiple types of membranes with properties tailored to hydrogen sulfide and carbon dioxide removal are utilized to remove acid gases. However, low membrane $H_2S/CH_4$ selectivity limits the range of biogas streams that can be treated to meet pipeline specifications and necessitates an additional method of $H_2S$ removal to meet product specification; the hydrogen sulfide removed by membrane processes must be sent to flair, leading to significant $SO_x$ emissions.

K. A. Lokhandwala et al., in U.S. Pat. No. 5,401,300, titled "Sour Gas Treatment Process Including Dehydration of the Gas Stream," disclose a membrane-based process for hydrogen sulfide removal combined with gas dehydration. However, low $H_2S/CH_4$ membrane selectivity limits the range of biogas streams that can be treated to meet pipeline specifications, and the hydrogen sulfide removed by membrane processes must be sent to flair, leading to significant $SO_x$ emissions.

Within the current state of the art, membrane systems can generate pipeline specification RNG products with carbon dioxide concentration under 2% with high methane recovery only by deploying a multi-stage membrane process configuration. These systems generate RNG with low energy consumption, significantly lower investment costs, and are easy to operate as compared to alternative purification processes. However, the generation of RNG products with low carbon dioxide concentrations, as low as 500 ppm and, in particular 50 ppm and below, required for liquefaction by membrane processes is not economical due to high compression energy consumption driven by high gas recycling volumes. The stand-alone membrane system is utilized primarily to remove carbon dioxide and the removal of multiple other impurities is carried out by auxiliary separation systems. Membrane systems exhibit modest $CO_2/CH_4$ gas selectivity. Meeting high-purity product requirements necessitates multi-stage membrane operation that increases complexity and cost.

State-of-the-art membrane systems are efficient in bulk carbon dioxide removal but require high electrical power consumption related to the recompression of recycled gases needed to attain high product purity combined with high methane recovery. Other impurities present in the raw biogas are removed by alternative separation processes, such as adsorption. In particular, the removal of hydrogen sulfide is carried out by adsorption processes before the gas is treated by a membrane process. Thus, there is still a need for an improved energy-efficient and lower-cost membrane-based biogas purification process that efficiently removes multiple contaminants, including acid gases and oxygen, while generating a high-purity renewable natural gas with high methane recovery.

SUMMARY OF THE INVENTION

The present invention provides a method and apparatus for the purification of raw biogas by a muti-stage membrane separation system that generates a high-purity Renewable Natural Gas (RNG) product with a high methane recovery. The method provides for the efficient removal of acid gases, such as carbon dioxide, hydrogen sulfide, and other impurities, such as oxygen, from the raw biogas, while generating RNG that meets the most stringent product purity specification. It is an object of the present invention to generate RNG of pipeline specification by a stand-alone membrane process with residual carbon dioxide product concentration below 2.0% mole, residual oxygen concentration below 0.5%, and overall methane recovery above 99.0%. In some embodiments of the invention, the residual carbon dioxide content is reduced to below 500 ppm, combined with methane recovery of 99.5% or more. It is a further object of the instant invention to generate high-purity RNG while removing multiple impurities by the membrane system simultaneously. These and other objectives are accomplished by generating a high-purity RNG product while maintaining a low compression energy consumption. The method and the apparatus of the invention provide for a novel integration of recycle streams generated by the multi-stage membrane system with compression equipment and other unit separation gas purification systems. The invention allows RNG production from a broad range of raw biogas streams, including landfill gas and digester gas.

The acid gases and a substantial fraction of oxygen are removed by the apparatus of the invention, which consists of a multi-stage membrane system integrated with two compressors. The individual components of the apparatus and their combination are optimized to increase hydrocarbon recovery while removing acid gases and the bulk of oxygen.

In one embodiment of the invention, the method of generating a high-purity hydrocarbon stream from a raw biogas feed stream containing methane, carbon dioxide, nitrogen, oxygen, water vapor, and hydrogen sulfide, wherein the raw biogas is available at substantially atmospheric pressure, comprises the steps of:

(i) compressing said raw biogas feed stream mixed with a recycled permeate gas stream and a recycled retentate gas stream generated by membrane separation units in a first compressor to a pressure from 6 to 25 barg followed by aftercooling and condensate separation, thereby forming a first effluent stream;

(ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream, said permeate third effluent stream being removed at substantially atmospheric pressure or a sub-atmospheric pressure;

(iii) passing the retentate second effluent stream to a second membrane separation unit, wherein the second membrane separation unit removes a portion of carbon dioxide, hydrogen sulfide, and oxygen from the retentate second effluent stream, thereby forming a retentate fourth effluent stream having a lower carbon dioxide, hydrogen sulfide, and oxygen content as compared to the retentate second effluent stream and a permeate fifth effluent stream enriched in carbon dioxide, hydrogen sulfide and oxygen content as compared to the retentate second effluent stream;

(iv) compressing said permeate third effluent stream in a second compressor to pressure from 2 to 6 barg, thus forming a sixth effluent stream;

(v) passing the sixth effluent stream to a third membrane separation unit, wherein the third membrane separation unit removes a portion of carbon dioxide, hydrogen sulfide, water vapor, and oxygen from the sixth effluent stream, thereby forming a retentate eighth effluent stream having a lower carbon dioxide, and water vapor content as compared to the sixth effluent stream and a higher oxygen content as compared to the raw biogas feed stream and a permeate seventh effluent stream with a carbon dioxide concentration above 95 volumetric percent, wherein the permeate seventh effluent stream is at substantially atmospheric pressure or a sub-atmospheric pressure;

(vi) passing said permeate fifth effluent stream to a front end of the first compressor, wherein the permeate fifth effluent stream defines the recycled permeate gas streams that is mixed with said raw biogas feed stream in step (i);

(vii) passing said retentate eighth effluent stream to a front end of the first compressor, wherein the retentate eighth effluent stream defines the recycled retentate gas stream that is mixed with said raw biogas feed stream in step (i); and (viii) wherein the retentate second effluent stream has a carbon dioxide concentration between 4 and 14% mole;

(ix) wherein a combined volume of the permeate fifth effluent stream and the retentate eighth effluent stream is from 20 to 40 percent of a volume of the said raw biogas feed gas stream for standard pipeline biomethane purity with carbon dioxide concentration between 2.0 and 0.2% mole and from 35 to 75 percent for high purity biomethane product with carbon dioxide purity below 0.2% mole;

(x) wherein a total gas processing capacity of gas separation membranes in the second membrane separation unit is higher than a total gas processing capacity of the gas separation membranes in the first membrane separation unit, the total capacity being measured by permeating Grade 4.8 nitrogen under standard conditions as defined in the description;

(xi) wherein the first and third membrane separation units are equipped with semipermeable polymeric hollow fiber membranes exhibiting a $CO_2/CH_4$ gas separation factor above 40, and the second membrane separation unit is equipped with semipermeable polymeric hollow fiber membranes exhibiting a $CO_2/CH_4$ gas separation factor above 20; and (xii) collecting the retentate fourth effluent stream generated by the second membrane separation unit as a high-purity hydrocarbon product, wherein the retentate fourth effluent stream has an increased methane content and reduced hydrogen sulfide, oxygen, and carbon dioxide content as compared to the raw biogas feed stream;

(xiii) and optionally collecting the permeate seventh effluent stream as a product.

In another embodiment for the high-purity RNG generation, the second membrane separation stage of the apparatus can consist of two membrane separation modules in a sequence, wherein a first membrane separation module in the sequence receives the retentate second effluent stream and generates a retentate ninth effluent stream with a reduced carbon dioxide, hydrogen sulfide, and oxygen content as compared to the retentate second effluent stream, the retentate ninth effluent stream being treated in a second membrane separation module in the sequence, wherein the second membrane separation module generates the retentate fourth effluent stream with reduced carbon dioxide, hydrogen sulfide and oxygen content as compared to the retentate ninth effluent stream, and a permeate tenth effluent stream enriched in carbon dioxide, hydrogen sulfide and oxygen content as compared to the ninth effluent stream, wherein the permeate tenth effluent stream is used as a sweep gas on a permeate side of the first membrane separation module in the sequence and the combined gas stream comprised of the permeate gas generated by the first membrane separation module in the sequence and the permeate tenth effluent stream generated by the second membrane module in the sequence form the fifth effluent stream recycled to the front end of the first compressor.

The multi-stage membrane apparatus of this invention removes acid gases, carbon dioxide, and hydrogen sulfide, from the raw biogas stream to meet stringent product purity specifications. In some embodiments, acid gas removal is combined with the removal of other contaminants, such as oxygen, by the membrane system. The raw biogas can contain variable concentrations of oxygen and nitrogen. The oxygen concentration can be as high as 4% and must be removed to meet the pipeline product specification. In many embodiments, the multi-stage membrane system provides for the efficient removal of oxygen to meet pipeline specifications.

The above and other features of the invention, including various novel details of construction and combinations of parts, and other advantages will now be more particularly described with reference to the accompanying figures and pointed out in the claims. It will be understood that the particular method and apparatus embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

Figure 1:
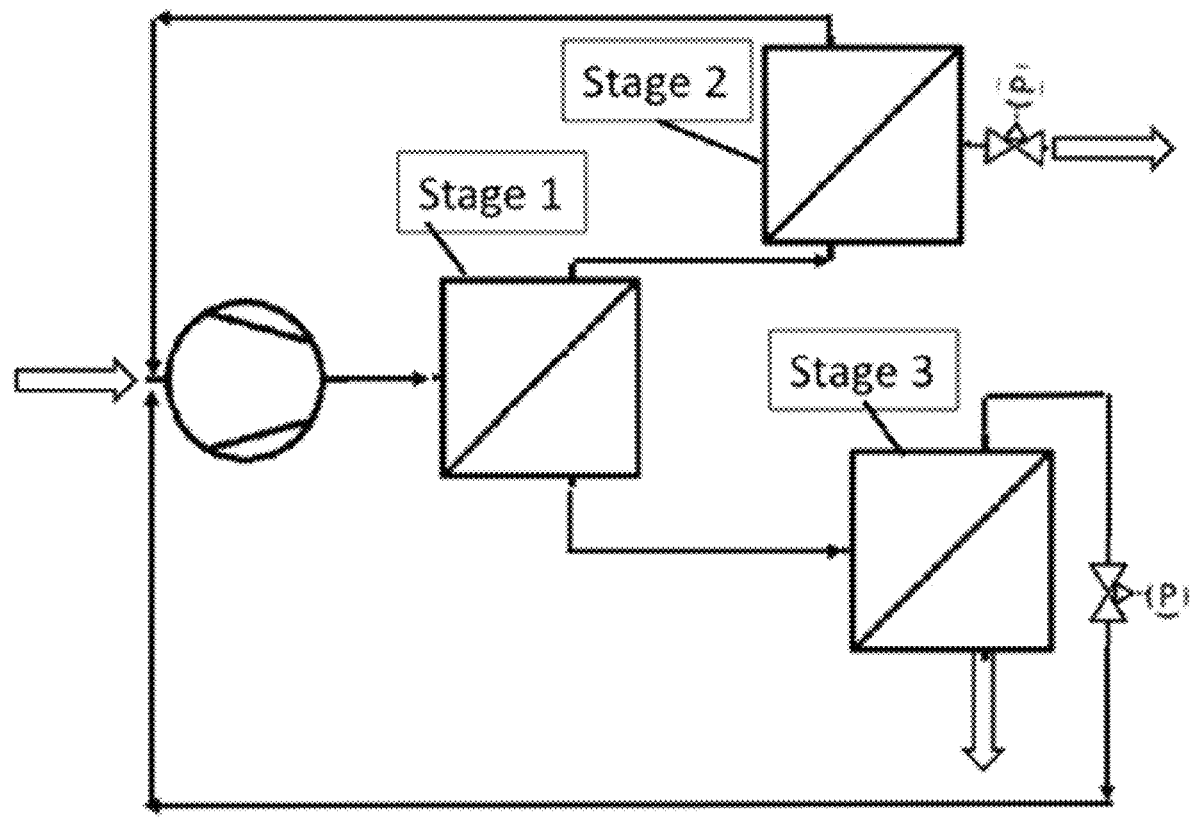
FIG. 1 is a schematic drawing of a raw biogas processing method disclosed in the prior art. The low-pressure biogas is treated in a membrane separation system composed of one feed compressor and a three-stage membrane system without gas recompression between membrane stages.

The present invention provides an improved method and apparatus for producing a high-purity renewable methane stream with methane recovery of 99% or higher from a broad range of raw biogas streams. Carbon dioxide and other impurities, including hydrogen sulfide, water vapor, oxygen, and nitrogen, are removed by a multi-stage membrane separation system integrated with two compressor systems. The multi-stage membrane system provides for the simultaneous removal of carbon dioxide, hydrogen sulfide, water vapor, and oxygen from raw biogas. The multi-stage membrane system features one permeate gas recycle stream and one retentate recycle stream generated by the multi-stage membrane system designed to increase methane recovery, while generating a product purity with carbon dioxide concentration below 2% mol, in some embodiments below 0.2% and in some embodiments as low as 50 ppm and lower. In one embodiment of the invention, the raw biogas available at atmospheric pressure is treated by a system consisting of three membrane separation stages integrated with high-pressure and low-pressure compressors to generate renewable natural gas (RNG). The permeate gas stream generated by the second membrane separation system and the retentate gas stream generated by the third membrane separation system is recycled to the front end of the high-pressure compressor. The process configuration provides for generating a pipeline purity RNG with residual $CO_2$ content lower than 2% including high purity RNG product with residual $CO_2$ content lower than 0.2% using a reduced membrane area or lower overall compression energy consumption or a combination of both noted parameters.

Raw biogas refers to a multi-component gas mixture generated by an anaerobic digestion process which is to be separated using the process of the present invention. Feed gas stream refers to a process stream that is supplied to the intake of the compressor. The feed gas stream corresponds to the raw biogas stream combined with recycle streams from the multi-stage membrane separation system, wherein the combined stream is directed to the primary high-pressure compressor intake port. In some embodiments, the raw biogas underwent preliminary purification to remove certain impurities, such as ammonia, and/or VOCs, or to reduce the water vapor dew point before the gas is directed to the intake of the compressor. The raw biogas may be available at atmospheric pressure or can come from a source that is already at a pressure above atmospheric pressure. The raw biogas that underwent preliminary purification can also be available at above atmospheric pressure. However, the feed gas stream will require pressurization before being processed by the method of the invention. The raw biogas or the feed gas stream is specified as available at a substantially atmospheric pressure to indicate the need to compress the gas prior to gas processing to remove undesirable impurities by the method of the invention.

The carbon dioxide concentration of biogas varies from above 25% to as high as 60%, more commonly from 30% to 55%. Biogas is water vapor saturated and can contain a variable amount of hydrogen sulfide, which in most cases can be between 300 and 3,000 ppm, oxygen, nitrogen, VOCs, and other impurities that must be removed to generate a target purity product. In particular, the carbon dioxide must be removed, and the caloric value of the product gas increased before gas utilization for direct heat and power generation, for injecting the RNG product into the distribution grid or liquefaction (in the latter case $CO_2$ concentration should be as low as 50 ppm or below 30 ppm for some technological cases). The raw biogas available at a pressure that is substantially atmospheric is compressed and treated in a 3-stage membrane separation system of the instant invention to remove carbon dioxide, hydrogen sulfide, water vapor, and oxygen. The carbon dioxide concentration must be reduced to meet the local pipeline specification, which can vary from 5% to 2% mol or to as low as 2000 ppm or 1000 ppm if the feed gas contains a significant amount of inert gas components, such as nitrogen, or to as low as 30 ppm or 50 ppm if the biomethane is utilized for liquefaction. For liquefaction purposes, the gas must be further dehydrated to 0.1 ppm or as low as 1 ppm of the water vapor content.

The raw biogas stream can contain a significant amount of hydrogen sulfide and other sulfur-containing impurities that must be removed to meet customer product specifications. The hydrogen sulfide concentration can be as low as 10 ppm or as high as 3% and above for some biogas streams. To meet the pipeline gas specification the concentration of impurities must be reduced to a typical pipeline specification of hydrogen sulfide: 0.25-0.3 g/100 scf (6-7 mg/m$^3$) or less; total sulfur: 5-20 g/100 scf (115-460 mg/m$^3$) or less; water vapor: 4.0-7.0 lb/MM scf (60-110 mg/m$^3$) or less, and oxygen: 1.0% or less with total non-hydrocarbons content of 5% or less.

A known process configuration used commercially in processing raw biogas to generate renewable natural gas (RNG) with the pipeline purity specification (below $CO_2$ concentration of 2% mole) combined with 99.5% methane recovery is a three-stage membrane configuration (Stage 1, Stage 2, Stage 3) with one feed compressor (C), referring to FIG. 1. To generate an RNG product of target purity with $CH_4$ recovery above 99% recycled streams generated by membrane stages must have $CO_2$ content higher than the raw biogas and the permeate gas stream generated by the first membrane separation unit must be highly enriched in $CO_2$. This, in turn, leads to a high $CO_2$ content of the retentate stream generated by the first membrane stage that is directed into the second membrane separation stage and a high recycle volume of the second stage permeate. To optimize process economics, it is known in the art to deploy membranes with different gas separation and gas permeation characteristics in different membrane stages of the three-stage system. It is known to utilize membranes with high $CO_2/CH_4$ separation characteristics in stages 1 and 3 (preferable with a $CO_2/CH_4$ separation factor of 50 or above) while deploying membranes with a higher $CO_2$ gas processing capacity in stage 2 as compared to stages 1 and 3 but with a lower $CO_2/CH_4$ gas separation factor (preferably 20 and above) to lower costs associated with membrane module installation without a major increase in compression process energy consumption.

The process does not provide for the efficient removal of oxygen from the raw biogas. To meet certain pipeline specifications follow-up methods of oxygen removal are required. The process becomes uneconomical when a deep level of $CO_2$ gas removal is required to generate a high-purity RNG product, most significantly below a $CO_2$ gas concentration of 0.2% mole. The increase in cost is due to a dramatic increase in the membrane processing area requirements through all three stages and an increase in compression energy due to an increase in gas recycle volumes. Deep $CO_2$ gas removal is needed to generate a methane gas product that can be economically liquified. A deeper level of $CO_2$ gas removal can be required when a significant amount of nitrogen or other inert components are present in the feed gas. The product's combined $CO_2+N_2+O_2$ gas concentration must be maintained below 5 or 4% to meet pipeline specifications for a maximum allowed concentration of inert components. For direct liquefaction, the $CO_2$ gas concentration must be reduced to 500-2000 ppm, or preferably as low as 50 ppm. Levels above 50 ppm require further purification by adsorption processes before liquefaction.

The increase in membrane area processing capacity and in the required energy to generate high-purity RNG at high methane recovery is driven by several factors. In particular, the deep $CO_2$ gas removal requirement generates a low concentration of $CO_2$ in the permeate gas of the second membrane stage that is recycled to the front end of the compressor. This, in turn, leads to a decrease of $CO_2$ content in the feed gas of the first and third stages, which increases the required membrane processing area and leads to an increase of the third membrane stage retentate volume that is recycled to the front end of the compressor.

The economical processing of biogas to generate RNG is limited to methane gas product purity by the three-stage, one-feed compressor process configuration to about 0.1% mole of $CO_2$.

Figure 2:
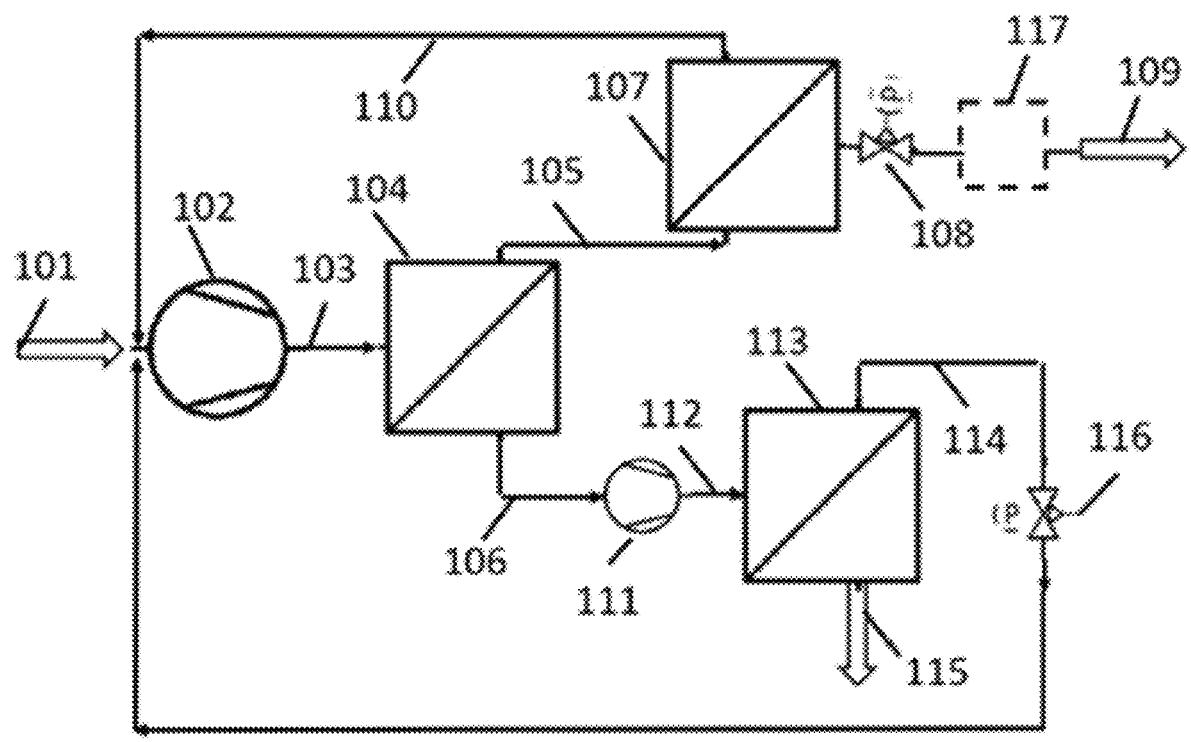
FIG. 2 is a schematic drawing of one exemplary embodiment of a method according to the invention, wherein a low-pressure biogas gas containing acid gases $CO_2$ and $H_2S$, water vapor, oxygen, and nitrogen is treated in a system comprised of a high-pressure compressor, a second, low-pressure compressor, and a three-stage membrane system. The multistage membrane system features two recycle streams designed to increase methane recovery. The permeate gas streams generated by the second membrane separation system and the retentate gas stream generated by the third membrane separation system are recycled to the front end of the high-pressure compressor.

It has been discovered, surprisingly, that the removal of carbon dioxide, oxygen and hydrogen sulfide from the raw biogas can be improved and a high-purity RNG product combined with a high methane recovery can be generated by the method of the instant invention; the method schematic is depicted in FIG. 2. The multi-stage membrane system provides for the simultaneous removal of carbon dioxide, hydrogen sulfide, water vapor, and oxygen from raw biogas. Carbon dioxide and other impurities are removed by the three-stage membrane separation system integrated with two compressors—a high-pressure and a low-pressure compressor system. The membrane system features one permeate gas recycle stream and one retentate gas recycle stream generated by the three-stage membrane system designed to increase methane recovery, while generating a high-purity product. The carbon dioxide product concentration can be reduced to as low as 50 ppm and in some embodiments as low as 30 ppm. The permeate gas stream generated by the second membrane separation unit is recycled to the front end of the high-pressure compressor. The recompression of the carbon dioxide-enriched permeate gas stream generated by the first membrane separation unit in the low-pressure separation stage requires a lower energy consumption than the permeate gas recompression in the high-pressure loop. To enable efficient removal of impurities and attainment of high purity RNG the following process conditions must be further implemented: (a) the retentate effluent stream generated by the first membrane separation unit must have a carbon dioxide concentration between 4 and 14% mole, (b) the combined volume of the permeate and retentate recycle streams must be from 20 to 40 percent of the volume of the said raw feed gas stream for the conventional biomethane product purity of carbon dioxide that ranges from 2 to 0.2% mol of carbon dioxide and from 35 to 75 percent for the high biomethane product purity with carbon dioxide concentration below 0.2% mol of carbon dioxide, (c) the total gas processing capacity of gas separation membranes in the second membrane separation unit must be higher than the total gas processing capacity of the gas separation membranes in the first membrane separation unit, the total capacity being measured by permeating Grade 4.8 nitrogen under standard conditions as defined in the description, (d) the first and third membrane separation units are equipped with semipermeable polymeric hollow fiber membranes exhibiting a $CO_2/CH_4$ gas separation factor above 40, and the second membrane separation unit is equipped with semipermeable polymeric hollow fiber membranes exhibiting a $CO_2/CH_4$ gas separation factor above 20.

An important aspect of the instant invention is the selection of optimal compression ranges between the high-pressure and the low-pressure membrane separation circuits. The feed raw biogas that is available at substantially atmospheric pressure is compressed in the first, high-pressure compressor to between 6 and 25 barg, preferably between 10 and 15 barg. The second compressor is deployed to increase the gas pressure of the permeate effluent stream generated by the first membrane separation unit that is collected at above atmospheric pressure, substantially at atmospheric pressure or sub-atmospheric pressure. This compressed effluent stream is directed into the third membrane separation unit for further processing. The effluent stream is compressed to pressure from 2 to 6 barg, preferably to 3 to 4 barg. High pressures of compression above 4 barg increase energy consumption and generate an excessive Joule-Thomson cooling effect during carbon dioxide permeation in the third membrane stage that can lead to membrane structural damage due to water freezing.

In most cases, the separation system elements of the apparatus of the present invention are configured such that a compressor, upstream of the first membrane separation stage, is used to generate the dominant driving force for membrane process separation stages with a second, low-pressure compressor providing a supplemental driving force. In some embodiments, at least one vacuum device in at least one of the membranes' permeate streams, is used to generate an additional driving force. The additional driving force in some embodiments is provided by an interstage booster.

The membrane separation units or stages are comprised of one or more membrane modules equipped with polymeric membranes. The membranes are preferably in a hollow fiber configuration. The hollow fiber membrane modules can be configured with shell side feed or bore side feed with the bore side feed being preferred. Membrane permeance is defined as material flow per unit of time, unit of membrane area, and differential pressure through a membrane. The term membrane selectivity as used and claimed in the present invention to characterize membrane performances is pure gas selectivity, independent of whether membranes are used to separate a two-component or a multi-component gas mixture. The selectivity for hollow fiber membranes is calculated as a quotient of the permeances of two pure gases at room temperature and differential pressure of 5 barg and is an indication of how well the membrane can separate a two-component gas mixture.

Membrane permeate refers to the gas stream obtained on the low-pressure side of the membrane, membrane module, or membrane separation step. Permeate gas refers in each case to gas generated by permeation through a polymeric membrane with gas component(s) enriched in the permeate stream relative to the respective feed stream at the membrane, at the membrane module, or in the membrane separation step. Retentate refers to the entire stream that is obtained on the high-pressure side of the membrane, membrane modules, or membrane separation step that does not pass through the membrane. Retentate gas refers to the component(s) enriched in each case in the retentate stream relative to the respective feed stream at the membrane, at the membrane module, or in the membrane separation step.

Membrane gas processing capacity as used in the present invention is defined as the product of the membrane surface area and the permeance of the membrane at operating temperature that is determined for nitrogen (Grade N4.8) under defined conditions. The nitrogen grade N4.8 is 99.998% Specialty Grade Nitrogen. The membrane surface area is the external surface of the hollow fiber membrane. Standard conditions are described in detail in the section on measurement methods below. The gas processing capacity of the hollow fiber membrane gas separation unit is calculated as follows:

$$\text{Capacity} = \text{Permeance}_{(N2)} \times \text{Surface area}$$

The permeance is measured with Nitrogen Grade N4.8 at the following defined conditions: an average operating temperature of the membrane separation stage identical for all stages, the feed gas pressure is 10 barg and the permeate gas pressure is 1 barg.

The raw feed biogas is available at a pressure that is substantially atmospheric and is compressed prior to being treated by the method of the invention, with the product methane gas directed into a pipeline or otherwise utilized. The feed gas is compressed to a pressure between 6 and 25 barg, preferably between 10 and 15 barg. Pressures below 6 barg result in a dramatic increase in the required membrane area, while pressures above 25 barg result in a significant increase in energy consumption required for the recycled gas recompression. The compressed feed biogas is treated in the first membrane separation unit, wherein the carbon dioxide, hydrogen sulfide, water vapor, and oxygen are removed by permeation. The retentate non-permeate gas generated by the first membrane separation unit may still contain an excess of carbon dioxide and, thus, is treated in an additional second membrane separation unit. The retentate from the second separation unit constitutes the RNG product. The permeate gas generated by the second membrane separation unit gas is collected at an atmospheric pressure or a sub-atmospheric pressure, The permeate gas generated by the second membrane separation unit contains a significant amount of recoverable methane. Thus, this permeate gas stream is recycled to the front end of the first, high-pressure compressor and combined with the raw biogas to increase methane recovery.

The permeate gas generated by the first membrane separation unit is collected at atmospheric or sub-atmospheric pressure and compressed in a second low-pressure compressor to a pressure between 2 and 6 barg, preferably between 3 and 4 barg, to form a sixth effluent stream. The sixth effluent stream is treated in a third membrane separation unit that removes additional impurities, including carbon dioxide, by permeation to generate a permeate gas stream with carbon dioxide concentration above 90 mole percent, preferably above 95 mole percent, most preferably above 98 mole percent. Compressing the sixth effluent stream to a pressure below 2 barg results in a sharp increase in the required membrane area, while pressures above 6 barg result in excessive energy consumption. The permeate gas stream generated by the third membrane separation unit can be collected at substantially atmospheric or sub-atmospheric pressure. The permeate gas can be collected at above atmospheric pressure, such as 0.5 barg, for further processing. Collecting the permeate gas at these pressures is defined as substantially atmospheric. The permeate stream can be further treated to remove hydrogen sulfide before utilization or disposal. The preferred method of hydrogen sulfide removal from the low-pressure gas comprised primarily of carbon dioxide is by a biological hydrogen sulfide removal process.

The retentate gas generated by the third membrane separation unit contains recoverable methane and is directed to the front end of the first, high-pressure compressor.

Some biogas gas may contain a significant concentration of inert impurities, such as nitrogen, in addition to oxygen. The RNG product gas carbon dioxide concentration may need to be reduced further to meet the consumer's total inert gas concentration limit. The excess nitrogen is removed by a pressure swing adsorption (PSA) system, together with oxygen.

The raw biogas can further contain a number of impurities in variable concentrations that must be removed prior to the gas being treated by membrane separation units following compression. These impurities may include siloxanes and volatile organic hydrocarbons, among others. These impurities are removed by methods well-known in the art and can include adsorption by activated carbon. It is within the scope of the invention to remove some impurities prior to compression while removing the rest of the impurities following compression.

The apparatus of the instant invention is equipped with polymeric membrane separation units. The use of polymeric membranes to purify biogas is known in the art. The membranes are in a hollow fiber configuration and are fabricated from engineering polymers, including polyimides and polysulfones. The polyimides disclosed in U.S. Pat. No. 5,591,250 and WTO International Publication Number WO 2011/009919 A1 are particularly preferred. The membrane separation units are comprised of one or more membrane separation modules equipped with polymeric gas separation membranes with modules arranged in series or in parallel. The hollow fiber membranes are packaged into modules with the bore side feed gas configuration most common in biogas treatment. The modules preferably operate in the counter-current flow mode between the feed and permeate gas streams to increase thermodynamic separation efficiency and reduce methane gas loss. Each module has polymeric membranes with a defined high-pressure side and low-pressure side, and each module has an inlet port connected to the high-pressure side, a retentate outlet port, and a permeate outlet port, the retentate outlet port providing an outlet for gas on the high-pressure side, and the permeate outlet port providing an outlet for gas on the low-pressure side. The feed gas is conveyed into the inlet port, the retentate gas is conveyed from the retentate outlet port, and the permeate gas is conveyed from the permeate port.

The modules are equipped with semipermeable polymeric membranes exhibiting a $CO_2/CH_4$ gas separation factor above 20, preferably above 35, and most preferably above 40, a hydrogen sulfide/methane separation factor above 9, preferably above 15, and most preferably above 20, and an oxygen/nitrogen separation factor above 5, preferably above 6 and most preferably above 7, as measured at room temperature utilizing pure gases. The membrane in stage one further exhibits a high oxygen/methane separation above 7, and most preferably above 9, as measured at room temperature. To enable nitrogen removal from the biogas, the polymeric membrane must exhibit a nitrogen/methane separation factor above 2, preferably above 2.7. The gas separation efficiency is affected by the pressure ratio, i.e., the feed gas to the permeate gas pressure ratio. To maintain high separation efficiency, the permeate gas from the third membrane separation unit is preferably collected at a low pressure, i.e., at atmospheric or sub-atmospheric pressure.

Membrane separation efficiency can deviate from an ideal preferred counter-current performance at high operational stage cuts. In hollow fiber membrane devices, several factors, including the non-uniformity of hollow fiber dimensions, can decrease membrane performance at high stage cuts. An added benefit of the method of the instant invention is the decrease in operational stage cut for the membrane separation stage as compared to the prior art. The reduction in the operation stage cut provides a material improvement in the commercial hollow fiber membrane separation module's performance. The polymeric membranes further exhibit high water vapor permeance combined with a high $H_2O/CH_4$ separation factor. The water vapor is removed by permeation, generating the RNG product that meets the most stringent product specification.

It is further within the scope of the invention to deploy membranes with different separation characteristics in the first, second, and third membrane separation units. The first stage membrane separation unit is configured to remove $CO_2$, $H_2S$, water vapor, and $O_2$ from the methane by utilizing a membrane with high $CO_2/CH_4$, $H_2S/CH_4$, and high $O2/CH_4$ selectivity. The third stage membrane separation unit is configured to concentrate methane in the retentate stream while removing carbon dioxide, hydrogen sulfide, water vapor, and oxygen into the low-pressure permeate stream utilizing membranes with a high separation efficiency. By configuring the third membrane separation unit with a membrane exhibiting $CO_2/CH_4$ selectivity above 40, a higher-purity carbon dioxide can be generated for independent use or sequestration. The second membrane separation unit preferably is configured to increase membrane gas processing capacity by using highly permeable membranes as compared to the first and the third membrane separation units with a lower $CO_2/CH_4$ gas selectivity.

The gas processing capacity between the membrane separation units can differ. It is preferred that the ratio of the total gas processing capacity, measured for nitrogen Grade N4.8 under standard conditions as defined in the description, of the membranes used in the second membrane separation unit to the total capacity, measured for nitrogen Grade 4.8 under standard conditions as defined in the description, of the membranes used in the first membrane separation unit is in a range from 1.05 to 10, preferably from 1.1 to 8, more preferably from 1.2 and 7 and most preferably from 1.5 to 6.

The operating temperature in each membrane stage may be the same or different to optimize the overall separation efficiency. The gas may be preheated or cooled between stages to control the temperature. The RNG product pressure can be further boosted to meet the pipeline pressure or consumer specification.

The membrane productivity (permeance) and selectivity are a function of specific membrane selection as well as operating process conditions, such as temperature, and for some membrane materials, the separation efficiency can be further affected by the partial pressure of carbon dioxide in the feed. The optimal membrane area selection for each membrane separation stage is driven by membrane performance characteristics and process conditions as would be known to those skilled in the art. The membrane area for each membrane stage is optimized by the number of modules selected and arranged in parallel. A series arrangement is less favorable since it can increase the pressure drop through the unit.

The product purity with respect to carbon dioxide concentration is controlled primarily by valves positioned on the retentate lines of membrane separation units two and three and, additionally, by regulating the gas processing capacity of the membrane stages (via the selection of polymeric membrane gas processing characteristics and adjustment of membrane surface area in the stages). The temperature of individual membrane stages is further used to control membrane performance. The methane product purity and recovery are controlled by retentate valve settings that, in turn, control the stage cut of membrane separation stages. Namely, the ratio of the permeate gas volume to the feed gas volume—the stage cut, i.e., the fraction of the feed gas conveyed to the membrane permeate side, wherein the impurities are removed. Thus, a valve position on the retentate line determines retentate product purity. A valve position on the retentate line of the second membrane separation unit controls the final carbon dioxide product purity by determining the permeate gas volume directed to recycle. A valve position on the retentate line of the third membrane separation unit determines the carbon dioxide concentration of the retentate gas and the amount of gas volume recycled to the front end of the high-pressure compressor.

The low-pressure biogas gas containing acid gases $CO_2$ and $H_2S$, water vapor, oxygen, and nitrogen is treated by the apparatus of the invention that includes two compressors (a high-pressure compressor and a low-pressure compressor), and a three-stage membrane system. The apparatus is shown schematically in FIG. 2. The three-stage membrane apparatus features a permeate gas recycle stream, and a retentate gas recycle stream designed to increase methane recovery. It was found surprisingly that to generate an RNG product with carbon dioxide concentration below 2.0% mole and a residual oxygen concentration of 0.5% or below combined with methane recovery above 95%, preferably above 99% and most preferably above 99.5%, economically, the following process conditions must be implemented: (i) the raw biogas combined with permeate and retentate recycle streams must be compressed to a pressure from 8 to 16 barg followed by aftercooling and condensate separation, (ii) the third permeate effluent stream generated by the first membrane separation unit must be compressed by the second, low-pressure compressor to pressure from 3 to 4 barg, (iii) the carbon dioxide concentration of the second retentate effluent stream generated by the first membrane separation unit must be maintained between 4 and 14% mole, the combined volume of the permeate and retentate recycle streams must be from 20 to 40 percent of the volume of the raw feed gas stream for biomethane/RNG product of conventional carbon dioxide purity that range from 2 to 0.2% mole of carbon dioxide and the combined volume of the permeate and retentate recycle streams must be from 35 to 75% of the volume of the raw feed gas for biomethane/RNG of high purity with residual $CO_2$ content in the biomethane below 0.2% mole, (iv) the total gas processing capacity of gas separation membranes in the second membrane separation unit must be higher than the total gas processing capacity of the gas separation membranes in the first membrane separation unit, the total capacity being measured by permeating Grade 4.8 nitrogen under standard conditions as defined in the description, and (v) the first and third membrane separation units are equipped with semipermeable polymeric hollow fiber membranes exhibiting a $CO_2/CH_4$ gas separation factor above 40, and the second membrane separation unit is equipped with semipermeable polymeric hollow fiber membranes exhibiting a $CO_2/CH_4$ gas separation factor above 20.

RNG product carbon dioxide concentration of the fourth effluent stream generated by the second membrane separation unit can be thus reduced to below 2% mole, in some embodiments below 0.2%, and even below 50 ppm, while maintaining the overall methane recovery by the process above 99%, preferably above 99.5%.

The method of the invention, wherein a low-pressure biogas gas containing acid gases $CO_2$ and $H_2S$, water vapor, oxygen, and nitrogen is treated to generate renewable natural gas (RNG) is shown schematically in FIG. 2. The apparatus includes two compressors (high-pressure and low-pressure compressors), and a three-stage membrane system. The three-stage membrane system features a permeate recycle stream, and a retentate recycle stream designed to increase methane recovery.

With reference to FIG. 2, the raw feed biogas (101) is combined with the permeate gas recycle stream (110) generated by the second membrane separation unit (107) and the retentate gas recycle stream (114) generated by the third membrane separation unit (113) and compressed in compressor (102), followed by aftercooling and condensate separation (not shown) forming the first effluent stream (103). The first effluent stream (103) is treated in the first membrane separation unit (104) that removes carbon dioxide, hydrogen sulfide, water vapor, oxygen, and nitrogen, thus forming a third permeate effluent stream (106) and the second retentate effluent stream (105), depleted in carbon dioxide, hydrogen sulfide, water vapor, oxygen, and some fraction of nitrogen as compared to the first effluent stream (103).

The second retentate effluent stream (105) is treated in the second membrane separation unit (107) that removes additional carbon dioxide, hydrogen sulfide, oxygen, and some fraction of nitrogen, thus forming the fifth permeate effluent stream (110) and the fourth retentate effluent stream (109) collected as RNG product. The fifth permeate effluent stream (110) is collected at atmospheric pressure or a sub-atmospheric pressure and is recycled to the front end of the compressor (102) to increase methane recovery.

The third permeate effluent stream (106) is collected at above atmospheric, substantially atmospheric, or sub-atmospheric pressure. The third permeate effluent stream (106) pressure is boosted by a compressor (111) to generate the sixth effluent stream (112) that is being treated in the third membrane separation unit (113). The third membrane separation unit (113) generates the seventh permeate effluent stream (115), comprised of carbon dioxide with a volumetric concentration above 90%, and the eighth retentate effluent stream (114), enriched in methane, oxygen, and nitrogen content. The seventh permeate effluent stream (115) is collected at substantially atmospheric or sub-atmospheric pressure (permeate collected at an elevated pressure in the range of 0.5 barg is defined as substantially atmospheric). In some embodiments, the seventh permeate effluent stream (115) is removed at a sub-atmospheric pressure above 0.2 bara by way of a vacuum pump (not shown).

The eighth retentate effluent stream (114), containing recoverable methane, is recycled to the front end of the compressor (102) and combined with the raw feed biogas (101) and the fifth effluent permeate stream (110). The combined streams are compressed in the compressor (102) to form the first effluent stream (103).

The method of the invention is optimized to reduce methane losses and generate RNG with a high methane recovery, preferably above 99.5%. To reduce methane loss, the carbon dioxide concentration in the seventh permeate effluent stream (115) is maintained above 90 mole percent, preferably above 95 mole percent, and most preferably above 98 mole percent.

The seventh permeate effluent stream (115), comprised primarily of carbon dioxide, hydrogen sulfide, oxygen, and water vapor, can be utilized to generate a supplemental carbon dioxide product pending additional purification. Additional purification to remove hydrogen sulfide may be necessary before the stream can be dispersed into the atmosphere. The preferred method of hydrogen sulfide removal is by a biological desulfurization process.

Biological desulfurization technologies are well established and their use for biogas treatment can be generically divided into segments that differ in methods of oxygen introduction and utilization in the bioprocess. Oxygen is the prerequisite to enable $H_2S$ oxidation and removal and proceeds according to the following mechanisms:

$$H_2S + 0.5O_2 \rightarrow S^0 + H_2O$$

$$H_2S + 2O_2 \rightarrow SO_4^{2-} + 2H^+.$$

The process proceeds with $H_2S$ oxidation to elemental sulfur and/or sulfuric acid. The oxygen supply and process conditions determine the balance between sulfur and sulfuric acid formation.

The apparatus of this invention may further include an adsorption-based $H_2S$ removal unit to reduce the hydrogen sulfide concentration of the fourth retentate effluent stream (109) below 4 ppm prior to utilization. The optional auxiliary adsorption unit (117) can utilize an activated carbon adsorbent optimized for $H_2S$ removal or other adsorbent materials as is well known in the art. The apparatus may further include an additional oxygen removal unit. The thermal oxidation oxygen removal unit can be positioned between the first membrane separation unit (104) and the second membrane separation unit (107). The second membrane separation unit (107) beneficially removes water vapor generated by the thermal oxidation unit, eliminating the need for a separate dryer. Alternatively, the thermal oxidation oxygen removal unit can be positioned to treat the final product, the fourth retentate effluent stream (109). In this case, the thermal oxidation unit must be followed by the water removal unit. The optional deoxygenation auxiliary units are not shown.

The product RNG stream is generated with a carbon dioxide concentration below 2.0 mol %, preferably below 0.2 mol %, most preferably below 50 ppm, and reduced oxygen concentration. The high purity RNG product is generated with reduced compression energy consumption and reduced membrane gas processing capacity area requirements.

The RNG product methane purity of the fourth retentate effluent stream (109) is a function of the stage cut of the second membrane separation unit (107), which is controlled by the valve (108). The gas composition of the second retentate effluent stream (105) treated in the second membrane separation unit (107) is determined by the gas processing capacity of the first and second membrane separation units (104, 107) and the gas permeation/separation characteristics of the polymeric membrane deployed at the process pressure and temperature conditions. These factors, in turn, determine the stage cut at which the first membrane separation unit (104) operates (the ratio of the permeate gas flow volume to the feed gas flow volume). It was found surprisingly that the carbon dioxide concentration in the second retentate effluent stream (105) that is treated in the second membrane separation unit (107) must be maintained between 4 and 14 mole percent, preferably between 6 and 12 mole percent, to minimize the required membrane gas processing area and lower the separation process energy consumption. This is a marked difference from the prior art of 3-stage membrane separation with 1 compressor (with reference to FIG. 1), where carbon dioxide concentration after the first stage is circa 20% and cannot be lowered to 14% or below. This, in turn, leads to the stage cut increase of the second membrane separation stage and a high recirculation volume of the fifth effluent stream.

The optimal value of $CO_2$ concentration in the retentate effluent stream generated by the first membrane separation unit tends to increase with the increase in RNG product purity. Thus, for the standard pipeline purity RNG with carbon dioxide concentration of 2.0 to 0.2% mole the optimum value of $CO_2$ content after the first membrane separation stage is 6-10 mol %, and for product RNG carbon dioxide purity below 0.2% mole the corresponding optimum value of $CO_2$ content after the first membrane separation stage is 8-12%.

The optimum value of $CO_2$ concentration in the retentate gas generated by the first membrane stage will change as a function of the feed gas pressure and RNG product purity. The carbon dioxide concentration is higher for the standard pipeline carbon dioxide purity specification as compared to the high-purity product specification. For the first stage feed gas pressure of 7.5 barg the optimum carbon dioxide concentration is 12-14 mol %, and for the first stage feed gas pressure of 13.5 barg the optimal carbon dioxide concentration is 6-10 mol %.

Carbon dioxide, hydrogen sulfide, and other impurities are removed in the seventh permeate effluent stream (115). The carbon dioxide concentration of the seventh permeate effluent stream (115) is a function of the stage cut of the third membrane separation unit (113) (the ratio of the permeate gas flow volume to the feed gas flow volume). A high $CO_2/CH_4$ gas separation factor above 40 and a high $H_2S/CH_4$ gas separation factor above 15 are preferred to minimize methane loss and increase acid gas removal efficiency. It was found, surprisingly, that the carbon dioxide concentration in the third permeate effluent stream (106) that is treated in the third membrane separation unit (113) must be maintained above 85 carbon dioxide mole percent to minimize methane losses in the seventh permeate effluent stream (115).

The gas volume of the eighth retentate effluent stream (114) and its residual carbon dioxide concentration are determined by the stage cut of the third membrane separation unit (113), which is controlled by the valve (116). The high stage cuts are preferable to minimize the recycle volume of the eight retentate effluent stream (114). However, stage cut values above 90% can be problematic in practical implementations due to variations in the characteristics of individual membrane cartridges and the variation in the characteristics of the individual fibers in each cartridge.

To attain a high purity RNG product wherein the carbon dioxide concentration of the second retentate effluent stream (105) is high in turn necessitates a high concentration carbon dioxide ratio reduction in the second membrane separation unit (107) to reduce the concentration of carbon dioxide to a carbon dioxide purity in the product stream as low as 50 ppm.

Figure 3A:
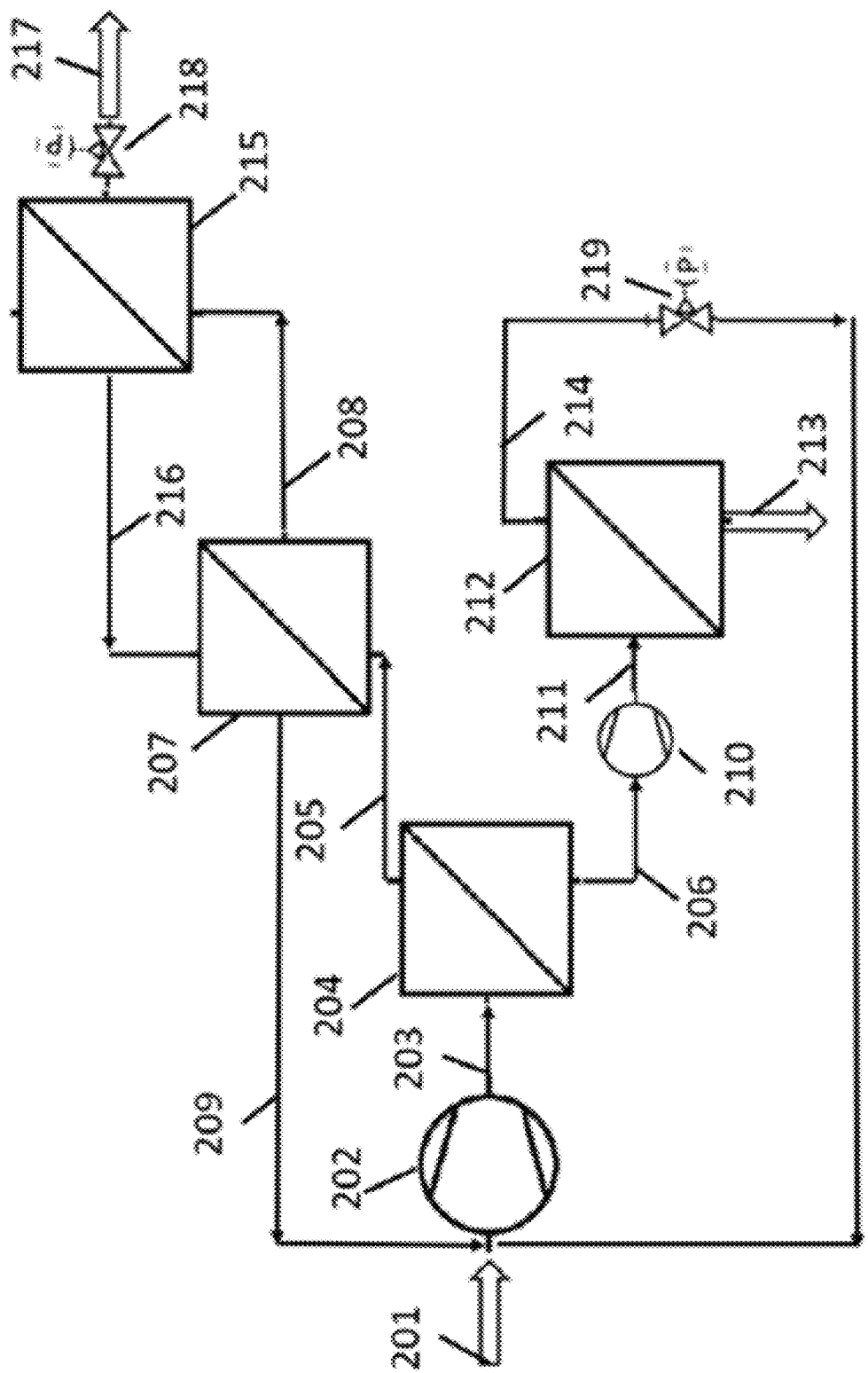
FIG. 3A is a schematic drawing of another exemplary embodiment of an apparatus according to the invention, wherein a low-pressure biogas gas containing acid gases $CO_2$ and $H_2S$, water vapor, oxygen, and nitrogen is treated in a system comprised of a high-pressure compressor, a second, low-pressure compressor, and a three-stage membrane system. In this embodiment, the second membrane separation stage consists of two membrane separation modules in a sequence. The first membrane module in the sequence receives the retentate effluent stream from the first membrane separation stage and, in turn, generates a retentate stream with a reduced carbon dioxide, hydrogen sulfide, and oxygen content as compared to the feed effluent stream. The retentate stream generated by the first membrane module is treated in a second membrane module of the two-module sequence. The second membrane module generates the product RNG retentate stream, and a permeate effluent stream enriched in carbon dioxide, hydrogen sulfide, and oxygen content as compared to the gas composition fed into the second membrane module. The permeate effluent stream generated by the second membrane module is used as a sweep gas on the permeate side of the first membrane module of the two-module sequence. The combined gas stream comprised of the permeate gas stream generated by the first membrane module in the sequence and the sweep stream generated by the second membrane module in the sequence forms the low-pressure effluent stream that is recycled to the front end of the high-pressure compressor. The multistage membrane system features two gas recycle streams designed to increase methane recovery. The retentate gas stream generated by the third membrane separation stage and the permeate gas stream generated by the second membrane separation stage (comprised of two membrane modules in a sequence) is recycled to the front end of the high-pressure compressor.

In another embodiment of the method of the invention, the raw biogas containing acid gases $CO_2$ and $H_2S$, oxygen, and nitrogen is treated in a system that includes two compressors, and a multistage membrane system, as shown schematically in FIG. 3A. The method is designed to treat raw biogas by removing multiple impurities and generating a high-purity RNG with residual $CO_2$ content lower than 1000 ppm, while minimizing compression energy consumption. The multistage membrane system features multiple recycle streams designed to increase methane recovery.

The embodiment is described further with reference to FIG. 3A. The raw feed biogas (201) is combined with a permeate gas recycle stream (209) generated by a second membrane separation unit comprised of modules (207, 215) and a retentate recycled gas stream (214) generated by a third membrane separation unit (212) and compressed in compressor (202), followed by aftercooling and condensate separation (not shown), forming the first effluent stream (203). The first effluent stream (203) is treated in the first membrane separation unit (204) that removes a fraction of carbon dioxide, hydrogen sulfide, water vapor, oxygen, and nitrogen from the first effluent stream (203), thus forming a third permeate effluent stream (206) and the second retentate effluent stream (205), depleted in carbon dioxide, hydrogen sulfide, water vapor, oxygen, and some fraction of nitrogen as compared to the first effluent stream (203).

The second retentate effluent stream (205) is treated in the second membrane separation unit, which is comprised of two membrane separation modules in a sequence (207, 215), wherein a first membrane separation module (207) in the sequence (207, 215) receives the second retentate effluent stream (205) and generates a ninth retentate effluent stream (208), with a reduced carbon dioxide, hydrogen sulfide, and oxygen content as compared to the second retentate effluent stream (205), the ninth retentate effluent stream (208) being treated in a second membrane separation module (215) of the two module sequence (207, 215), wherein the second membrane separation module (215) generates a fourth retentate effluent stream (217), with reduced carbon dioxide, hydrogen sulfide and oxygen content as compared to the ninth retentate effluent stream (208), and a tenth permeate effluent stream (216), enriched in carbon dioxide, hydrogen sulfide and oxygen content, wherein the tenth permeate effluent stream (216) is used as a sweep gas on a permeate side of the first membrane separation module (207) in the sequence (207, 215) and the combined gas stream comprised of the permeate gas stream generated by the first membrane separation module (207) of the sequence (207, 215) and the tenth permeate effluent stream (216) used as a sweep forms the fifth permeate effluent stream (209) recycled to the front end of the first compressor (202). The fourth retentate effluent stream (217) is collected as an RNG product. The fifth permeate effluent stream (209) is collected at atmospheric pressure or a sub-atmospheric pressure and is recycled to the front end of the compressor (202) to increase methane recovery. The gas processing capacity of the first (207) and second (215) membrane separation modules can be the same or different.

The RNG product methane purity of the fourth retentate effluent stream (217) is a function of the stage cut of the second membrane separation unit modules (207, 215), which is controlled by the valve (218). The stage cut of the second membrane separation unit comprised of modules (207, 215) is the ratio of combined permeate gas volumes generated by the first (207) and second (215) gas separation modules divided by the volume of the second retentate effluent stream (205), generated by the first membrane separation unit (204).

The membrane gas processing capacity of modules (207, 215) can be equal or different. It was found surprisingly that with the identical gas separation characteristics and gas processing capacity in both modules, the gas processing capacity of the second separation module (215) is preferably smaller as compared to the gas processing capacity of the first gas separation module (207) to provide lower required membrane area and lower energy consumption. The gas processing capacity ratio between the second (215) and first (207) modules can be below 1 to 2, preferably below 1 to 3, and most preferably below 1 to 4. It was found that the gas processing capacity of the second membrane separation module (215) as compared to the gas processing capacity of the first gas separation module (207) affected the attainment of the residual concentration of oxygen and hydrogen sulfide and, to a lesser degree, nitrogen in the RNG product. The processing capacity ratio selection between the stages is affected by the separation properties of the applied membranes and RNG product purity specification for the priority contaminants to be removed to a target purity, in particular oxygen and hydrogen sulfide, and tradeoffs between the required overall membrane area and energy consumption.

It is further within the scope of the invention to equip modules (207, 215) with polymeric membranes that have different gas separation and dimensional characteristics.

The third permeate effluent stream (206) is collected at substantially atmospheric or sub-atmospheric pressure. The third permeate effluent stream (206) pressure is boosted by a compressor (210) to generate the sixth effluent stream (211) that is being treated in the third membrane separation unit (212). The third membrane separation unit (212) generates the seventh permeate effluent stream (213), comprised of carbon dioxide with a volumetric concentration above 90%, and the eighth retentate effluent stream (214), enriched in methane, oxygen, and nitrogen content. The seventh permeate effluent stream (213) is collected at a substantially atmospheric or sub-atmospheric pressure (permeate collected at a modest elevated pressure in the range of 0.5 barg is defined as substantially atmospheric). In some embodiments, the seventh permeate effluent stream (213) is removed at a sub-atmospheric pressure above 0.2 bara by way of a vacuum pump (not shown).

The eighth retentate effluent stream (214), containing recoverable methane, is recycled to the front end of the compressor (202) and combined with the raw feed biogas (201) and the fifth permeate effluent stream (209). The combined streams are compressed in the compressor (202) to form the first effluent stream (203).

The residual carbon dioxide concentration in the eighth retentate effluent stream (214) generated by the third membrane separation unit (212) is determined by the stage cut of the third membrane separation unit (212), which is controlled by the valve (219).

Figure 3B:
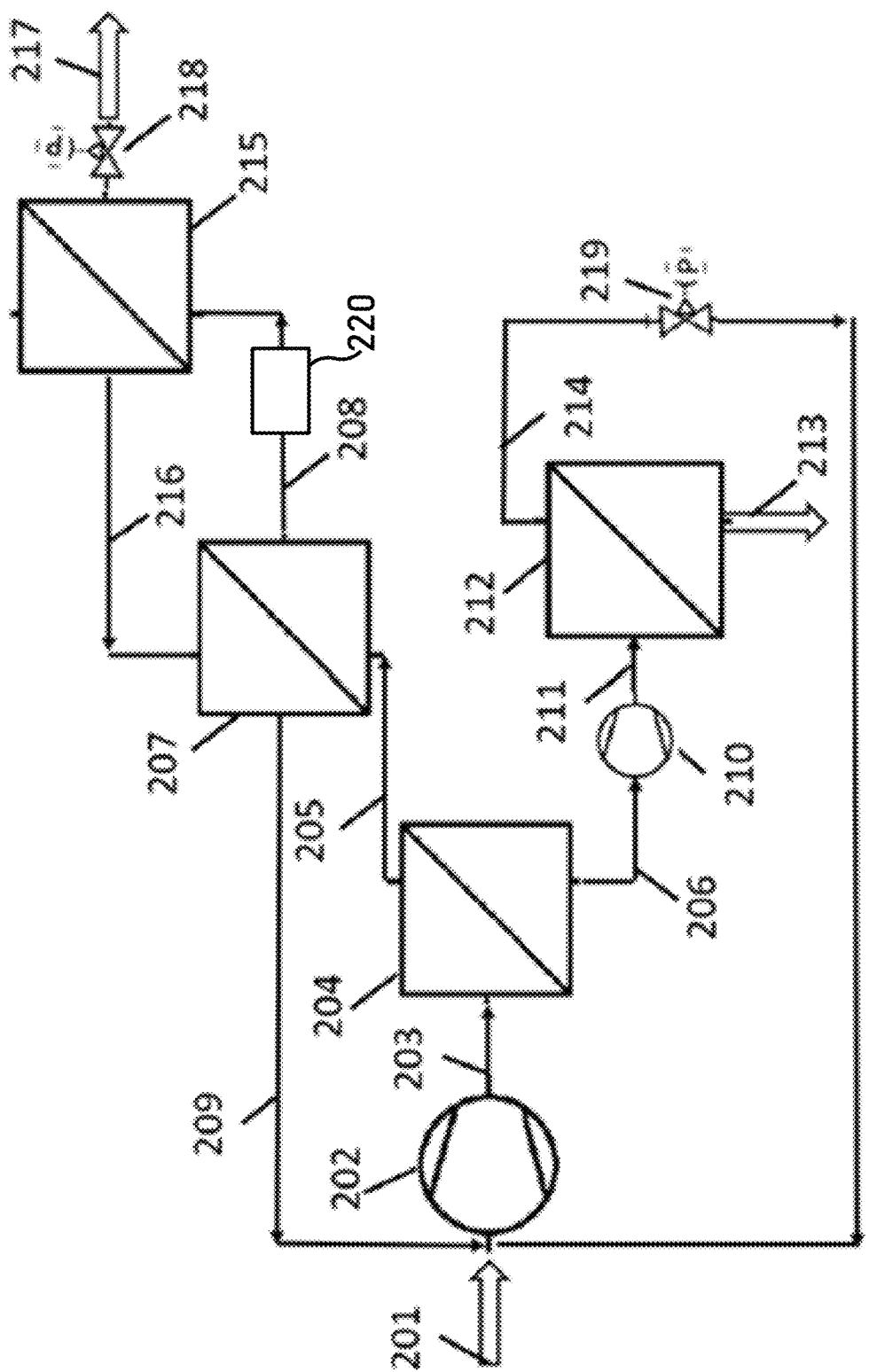
FIG. 3B is a schematic drawing of an exemplary embodiment of an apparatus according to the invention, which embodiment is similar to the embodiment shown in FIG. 3A, with the exception that a deoxygenation unit is disposed between the two membrane separation modules defining the second membrane separation stage.

Referring now to FIG. 3B, a system nearly identical to the system shown in FIG. 3A is presented. In this embodiment, however, a deoxygenation unit (220) is disposed in the ninth retentate effluent stream (208) between the first membrane separation module (207) and the second membrane separation module (215) defining the second membrane separation unit (207, 215). Since the deoxygenation unit (220) will generally generate at least some water, the second membrane separation module (215) may also act as a drier in order to reduce moisture to acceptable levels.

Figure 3C:
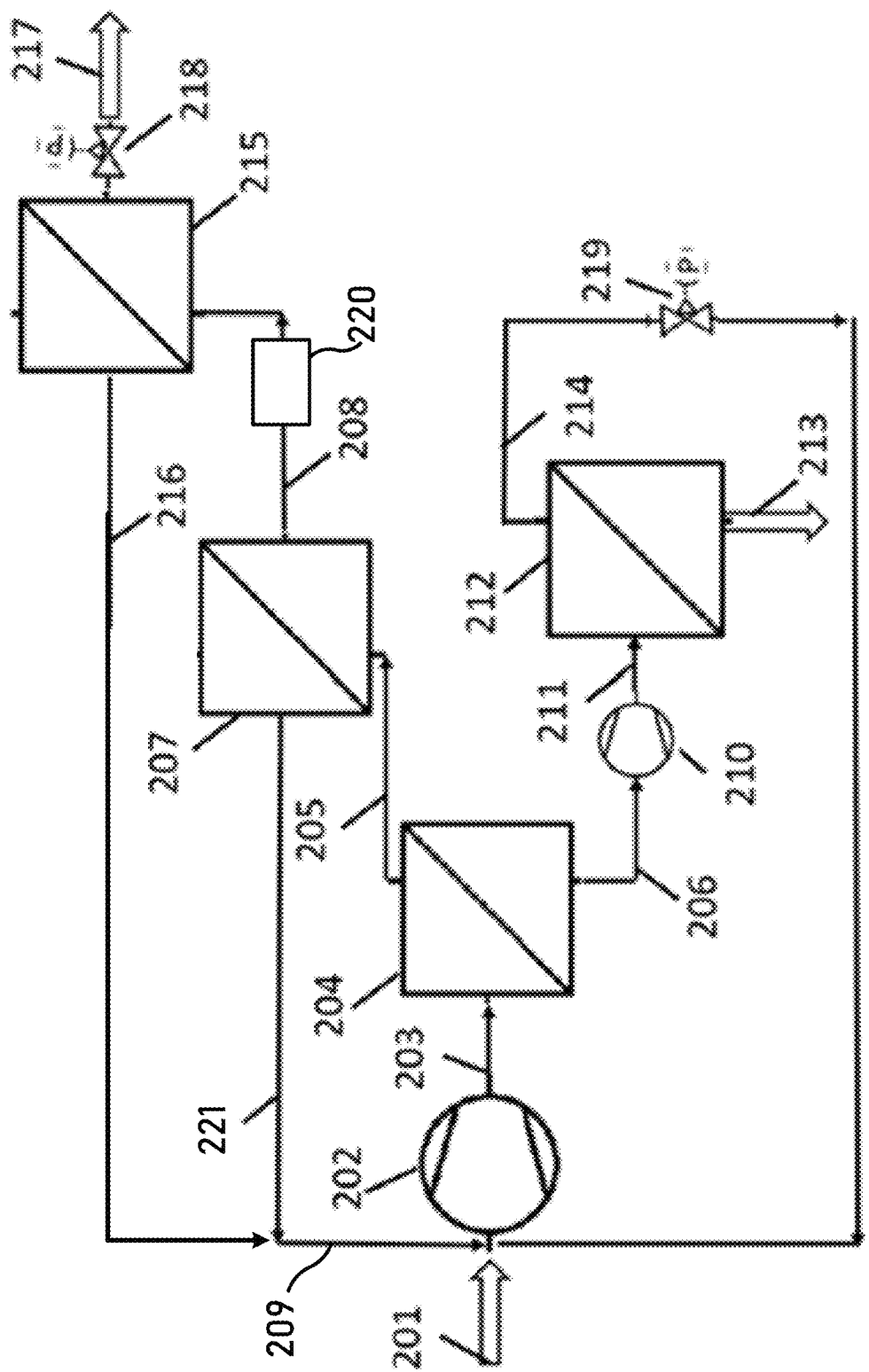
FIG. 3C is a schematic drawing of another exemplary embodiment of an apparatus according to the invention, which embodiment is again similar to the embodiment shown in FIG. 3A, with the exception that (1) a deoxygenation unit is disposed between the two membrane separation modules defining the second membrane separation stage, and (2) the permeate effluent stream generated by the second membrane module is not used as a sweep gas on the permeate side of the first membrane module of the two-module sequence, but instead is directly recycled to the front end of the high-pressure compressor along with the permeate gas stream generated by the first membrane module to together form the low-pressure effluent stream that is fed to the high-pressure compressor.

FIG. 3C is a further modification of the system shown in FIG. 3B, in which the tenth permeate effluent stream (216) generated by the second membrane separation module (215) bypasses first membrane separation module (207) of the two-module sequence—i.e., the tenth permeate effluent stream (216) is not used as a sweep gas on the permeate side of the first membrane separation module (207) of the two-module sequence)—but instead is directly recycled to the front end of the high-pressure compressor (202) along with the permeate gas stream (221) generated by the first membrane separation module (207) in order to together form the fifth permeate effluent stream (209) recycled to the front end of the high-pressure compressor (202).

While omitting the sweep function of the tenth permeate effluent stream (216) generated by the second membrane separation module (215) generally leads to higher energy usage (making the system overall less energy efficient), omitting the sweep function may allow for the use of industry standard membrane cartridges that are more readily commercially available, such that overall costs may be reduced.

Figure 3D:
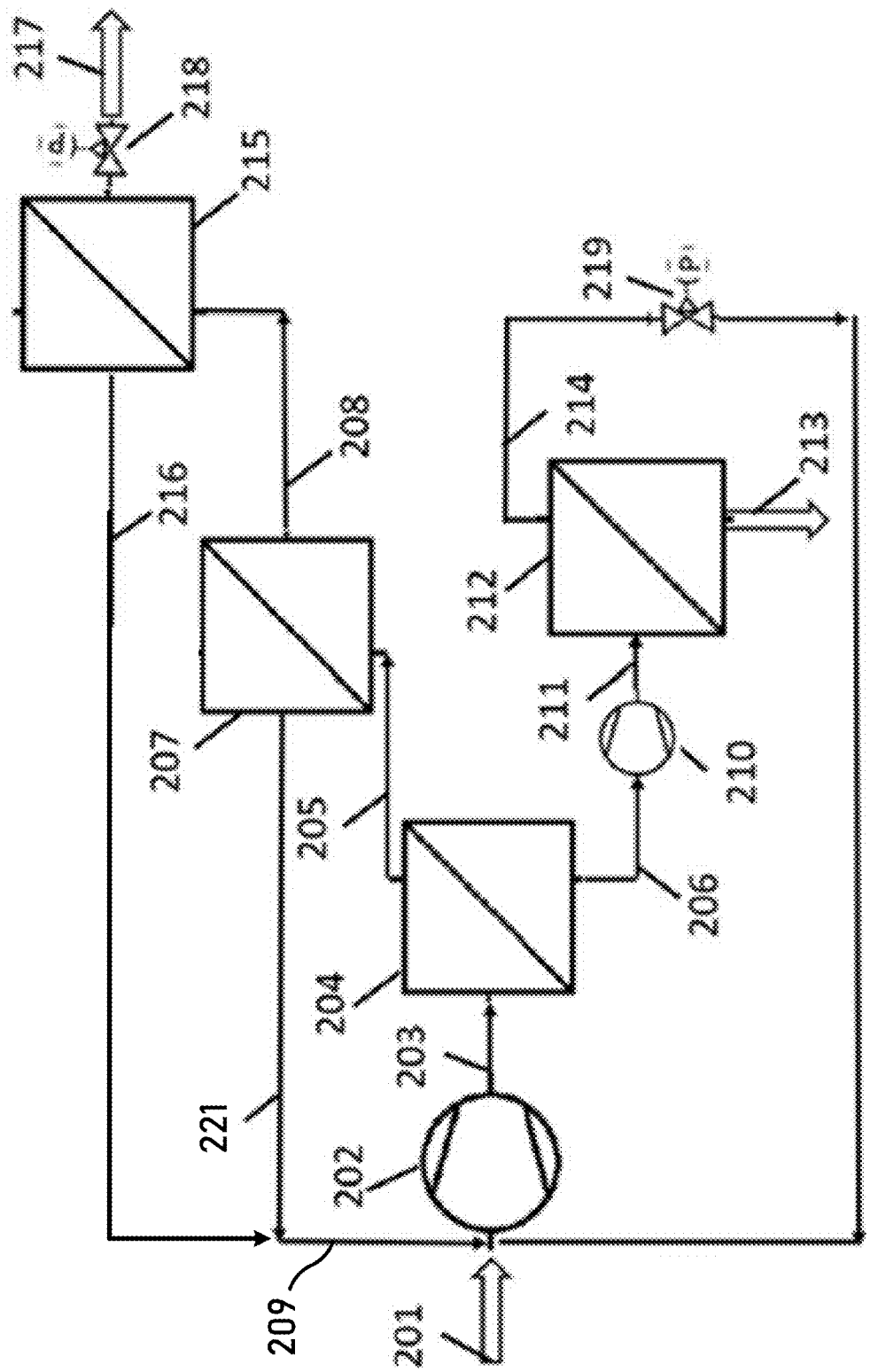
FIG. 3D is a schematic drawing of another exemplary embodiment of an apparatus according to the invention, which embodiment is similar to the embodiment shown in FIG. 3C, with the exception that no deoxygenation unit is disposed between the two membrane separation modules defining the second membrane separation stage.

FIG. 3D is a further modification of the system shown in FIG. 3C, in which the tenth permeate effluent stream (216) generated by the second membrane separation module (215) again bypasses first membrane separation module (207) of the two-module sequence—i.e., the tenth permeate effluent stream (216) is not used as a sweep gas on the permeate side of the first membrane separation module (207) of the two-module sequence)—but instead is directly recycled to the front end of the high-pressure compressor (202) along with the permeate gas stream (221) generated by the first membrane separation module (207) in order to together form the fifth permeate effluent stream (209) recycled to the front end of the high-pressure compressor (202). However, in this embodiment, the deoxygenation unit disposed in the ninth retentate effluent stream (208) between the first membrane separation module (207) and the second membrane separation module (215) defining the second membrane separation unit (207, 215) is dispensed with.

Figure 3E:
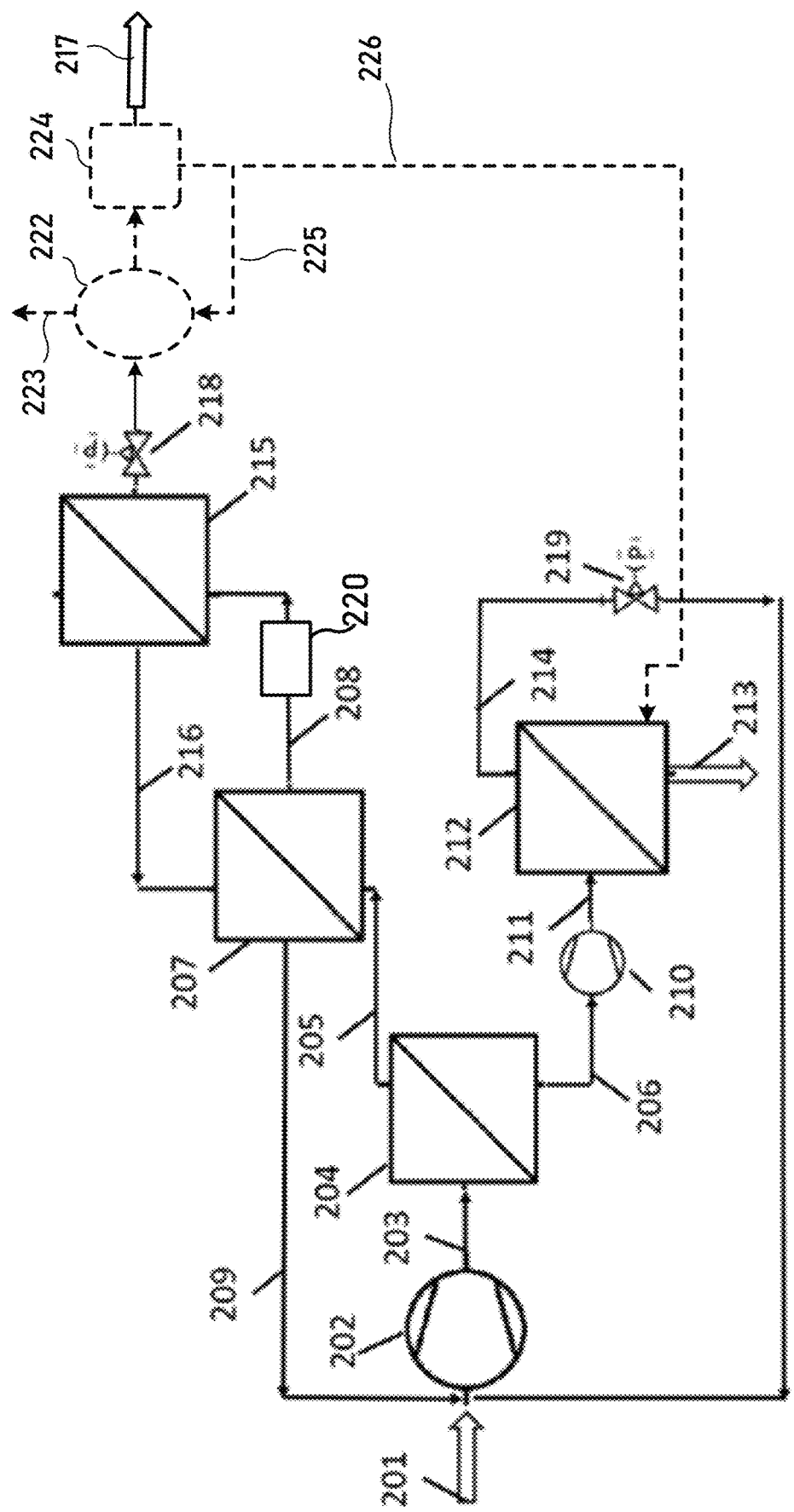
FIG. 3E is a schematic drawing of another exemplary embodiment of an apparatus according to the invention, which embodiment is similar to the embodiment shown in FIG. 3B, with the exception that an adsorption unit, which in turn is followed by a nitrogen rejection unit, is disposed in the retentate gas stream generated by the second membrane separation stage.

Referring now to FIG. 3E, a further modification of the system shown in FIG. 3B is shown, in which an adsorption unit (222) is optionally disposed in the fourth retentate effluent stream (217) prior to it being collected as the RNG product. The adsorbent in the adsorption unit (222) may be an activated carbon as but one example, and may be provided to reduce moisture and/or carbon dioxide, as well as other residual impurities, such as hydrogen sulfide and/or oxygen, to acceptable levels. The moisture, carbon dioxide and other residual impurities stream (223) may be vented or flared, as desired.

The retentate fourth effluent stream (217) may also optionally be treated to remove nitrogen in a cryogenic or adsorption-based nitrogen rejection unit (224). The nitrogen reject stream generated by the nitrogen rejection unit (224) may be used to regenerate the adsorption unit (222) (as indicated by stream 225) and/or as a sweep gas (as indicated by stream 226) on the permeate side of the third membrane separation unit (212).

Figure 3F:
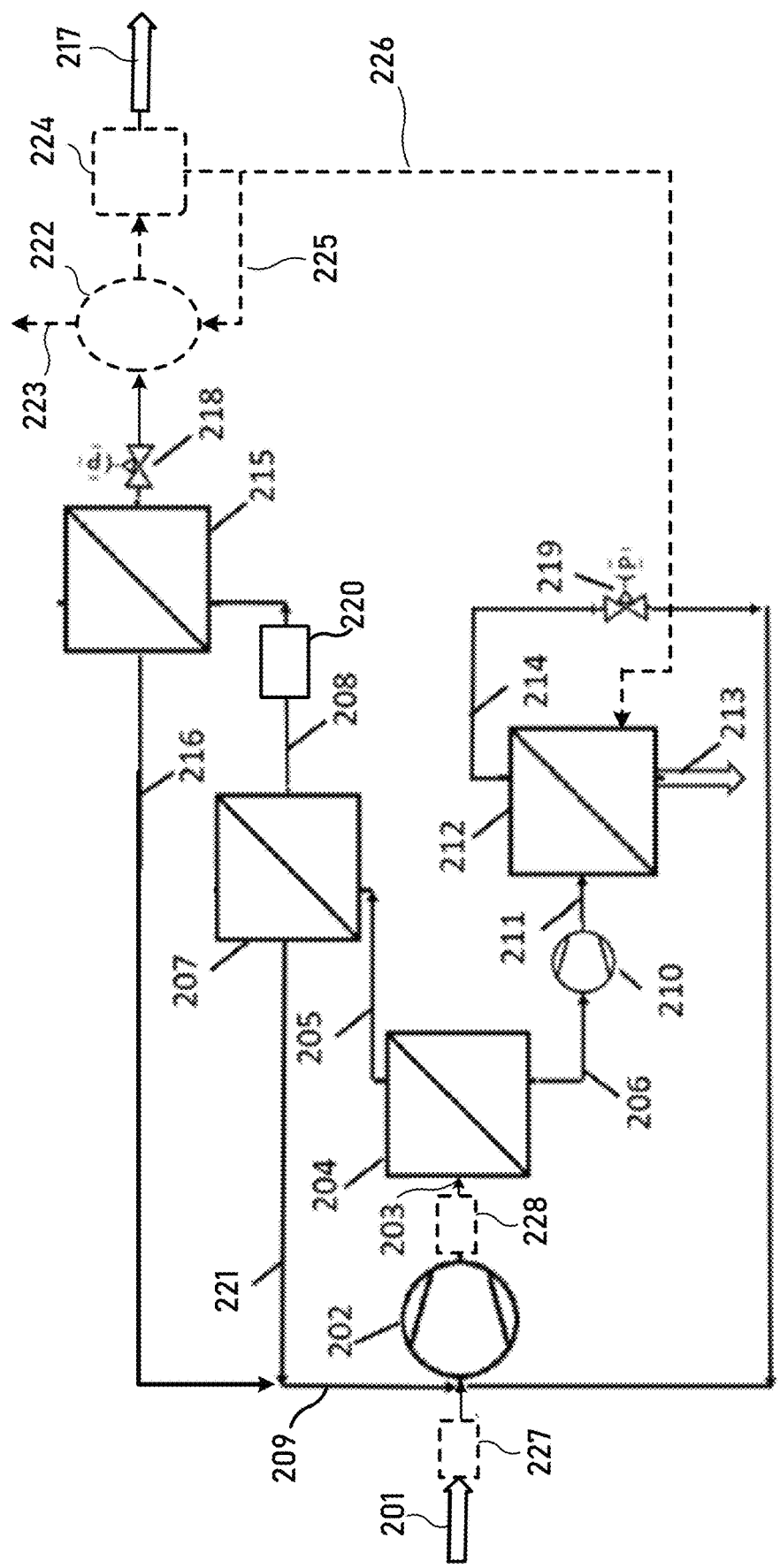
FIG. 3F is a schematic drawing of another exemplary embodiment of an apparatus according to the invention, which embodiment is similar to the embodiment shown in FIG. 3C, with the exception that an adsorption unit, which in turn is followed by a nitrogen rejection unit, is disposed in the retentate gas stream generated by the second membrane separation stage, and that one or more purification units are provided upstream of the first membrane separation unit.

FIG. 3F is a further modification of the system shown in FIG. 3C, in which an adsorption unit (222) is optionally disposed in the fourth retentate effluent stream (217) prior to it being collected as the RNG product. The adsorbent in the adsorption unit (222) may be an activated carbon as but one example, and may be provided to reduce moisture and/or carbon dioxide, as well as other residual impurities, such as hydrogen sulfide and/or oxygen, to acceptable levels. The moisture, carbon dioxide and other residual impurities stream (223) may be vented or flared, as desired.

The retentate fourth effluent stream (217) may also optionally be treated to remove nitrogen in a cryogenic or adsorption-based nitrogen rejection unit (224). The nitrogen reject stream generated by the nitrogen rejection unit (224) may be used to regenerate the adsorption unit (222) (as indicated by stream 225) and/or as a sweep gas (as indicated by stream 226) on the permeate side of the third membrane separation unit (213).

The raw biogas feed stream (201), the first effluent stream (203) or both may optionally be treated in one or more purification units (227, 228) to remove volatile organic compounds (VOCs) and to reduce water vapor content upstream of the first membrane separation unit (204). In some embodiments, the purification unit (227) may take the form of a biological hydrogen sulfide removal unit in order to remove hydrogen sulfide from the biogas feed stream (201) before it is combined with the recycled permeate gas streams and the recycled retentate gas stream.

Figure 3G:
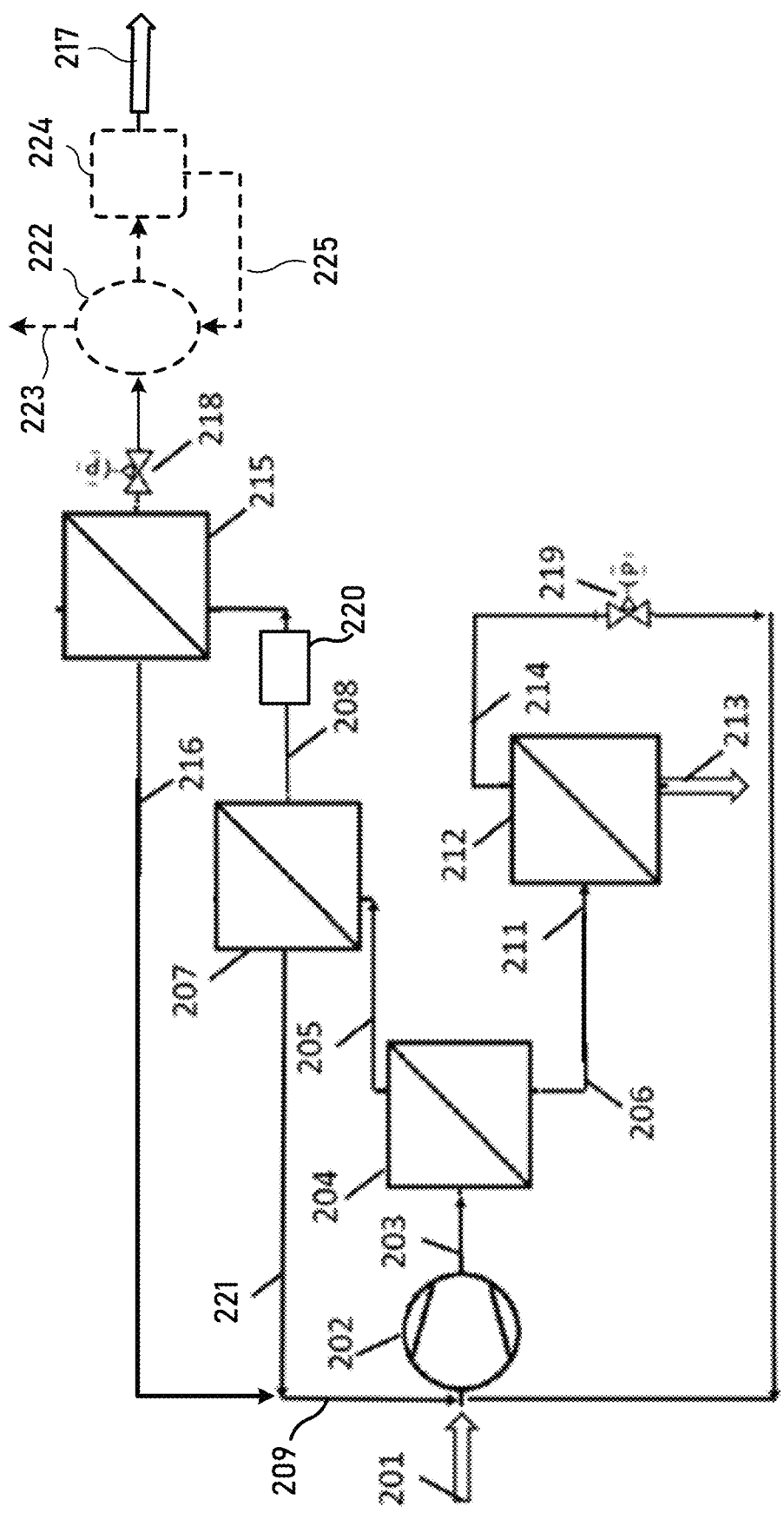
FIG. 3G is a schematic drawing of another exemplary embodiment of an apparatus according to the invention, which embodiment is similar to the embodiment shown in FIG. 3C, with the exception that an adsorption unit, which in turn is followed by a nitrogen rejection unit, is disposed in the retentate gas stream generated by the second membrane separation stage, and that only a single compressor is employed.

FIG. 3G is another modification of the system shown in FIG. 3C, in which an adsorption unit (222) is optionally disposed in the fourth retentate effluent stream (217) prior to it being collected as the RNG product. The adsorbent in the adsorption unit (222) may be an activated carbon as but one example, and may be provided to reduce moisture and/or carbon dioxide, as well as other residual impurities, such as hydrogen sulfide and/or oxygen, to acceptable levels. The moisture, carbon dioxide and other residual impurities stream (223) may be vented or flared, as desired.

The retentate fourth effluent stream (217) may also optionally be treated to remove nitrogen in a cryogenic or adsorption-based nitrogen rejection unit (224). The nitrogen reject stream generated by the nitrogen rejection unit (224) may be used to regenerate the adsorption unit (222) (as indicated by stream 225). Further, in this embodiment, unlike the embodiment shown in FIG. 3C, only a single compressor (202) is employed, with there being no second compressor being disposed between first membrane separation unit (204) and the third membrane separation unit (212).

The purification of raw biogas by the method of the instant invention is compared to biogas purification by the prior art 3-stage system (FIG. 1). The performance of several process design configurations was calculated, and the results are listed in Table 1. The process schematics of the designs are shown in FIGS. 1, 2, and 3, the former is a prior art design with a single compressor.

The method of the instant invention is further illustrated by Examples. The process design simulations are summarized in Tables 1-4. The simulations were carried out using the following assumptions:

Steady-state separation conditions, Non-ideal gas characteristics were included (fugacity corrected), Ideal counter-current flow configuration in all membrane separation units, Viscosity effect correction was introduced for changes in gas compositions, Pressure losses on the retentate side were included, Constant feed gas temperature to each membrane unit, JT temperature corrections within each stage made, The use of permeate sweep in the first module of the second separation stage by the permeate gas of the second module in the second separation stage for process configuration is shown in FIG. 3A.

The performance was calculated using identical input biogas feed gas composition and membrane performance design parameters for all cases. Composition of the inlet biogas in mole fractions: Methane 0.5375; $CO_2$ 0.43; Nitrogen 0.015; Oxygen 0.005; $H_2O$ 0.01; $H_2S$ 0.0025. The inlet biogas pressure was 0.15 barg and the temperature was +25° C. before the gas was combined with recycled gas streams. The feed biogas gas pressure after compression was 14 barg and 13.5 barg before the first membrane separation stage unless indicated otherwise. The compressed gas is cooled to +5° C. followed by condensate separation and reheating to +20° C. before the gas is introduced into the first membrane separation stage. The permeate of the first membrane stage is collected at a pressure of 0.2 barg and compressed by the second low-pressure compressor to 3.3 barg unless indicated otherwise with cooling to T=25° C. The processes were modeled by varying $CO_2$ gas concentration in the retentate of the first membrane separation stage (the second effluent stream). Identical parameters are used to model the three stage process configurations and the membrane separation characteristics deployed in membrane separation stages were optimized to reduce installed membrane processing cost. The design cases were modeled using membranes with a higher productivity were used in the second stage to reduce membrane installation cost without significant separation efficiency reduction.

The following membrane properties were used in process modeling:

Gas selectivity $CO_2/CH_4$ of 50 for stages 1 and 3, and $CO_2/CH_4$ selectivity of 21 for the second stage: $CO_2$ permeance of 0.01375 $Nm^3/(h*bar*ft^2)$ for stages 1 and 3, and $CO_2$ permeance of 0.023058 $NM^3/(h*bar*ft^2)$ for the second stage; Gas selectivity $H_2S/CH_4$ of 12 for stages 1 and 3, and $H_2S/CH_4$ selectivity of 9 for the second stage; $H_2S$ permeance of 0.0033 $Nm^3/(h*bar*ft^2)$ for stages 1 and 3, and $H_2S$ permeance of 0.009882 $NM^3/(h*bar*ft^2)$ for the second stage;

Gas selectivity $O_2/CH_4$ of 14 for stages 1 and 3, and $02/CH_4$ selectivity 10 for the second stage, $O_2$ permeance of 0.00385 $Nm^3/(h*bar*ft^2)$ for stages 1 and 3, and 02 permeance of 0,01098 $NM^3/(h*bar*ft^2)$ for the second stage;

Gas selectivity $N2/CH_4$ of 2.0 for stages 1 and 3, and $N2/CH_4$ selectivity of 2.8 for the second stage; $N_2$ permeance of 0.00055 $Nm^3/(h*bar*ft^2)$ for stages 1 and 3, and $N_2$ permeance of 0.003075 $Nm^3/(h*bar*ft^2)$ for the second stage; and Gas selectivity $H_2O/CH_4$ of 150 for stages 1 and 3, and $H_2O/CH_4$ selectivity of 70 for the second stage; $H_2O$ permeance of 0.04125 $Nm^3/(h*bar*ft^2)$ for stages 1 and 3, and $H_2O$ permeance of 0.07685 $Nm^3/(h*bar*ft^2)$ for the second stage.

In all cases, the process was modeled to attain 99.5% methane recovery with carbon dioxide product purity at 1.5, 0.1 or 0.005% mole.

TABLE 1

| Table Y No | Parameter | 3-stage 1 compressor FIG. 1 Var. 1 | 3-stage 1 compressor FIG. 1 Var.2 | 3-stage 1 compressor FIG. 1 Var.3 | 3-stage 2 compressors FIG. 2 Var. 1 | 3-stage 2 compressors FIG. 2 Var. 2 | 3-stage 2 compressors FIG. 2 Var. 3 |
|---|---|---|---|---|---|---|---|
| 1. | Biomethane target $CO_2$, % mole | 1.5 | 1.5 | 1.5 | 1.5 | 1.5 | 1.5 |
| 2. | $CO_2$ content after stage 1, % mole | 16.0 | 20.0 | 24.0 | 6.0 | 8.0 | 10.0 |
| 3. | Pressure before stage 3, barg | 1.6 | 2.5 | 3.3 | 3.3 | 3.3 | 3.0* |
| 4. | Stage cut %, stage 1 | 40.64 | 37.94 | 35.91 | 43.56 | 40.73 | 39.11 |
| 5. | Stage cut %, stage 2 | 32.47 | 36.9 | 40.97 | 18.05 | 21.8 | 24.93 |
| 6. | Stage cut %, stage 3 | 75.79 | 79.32 | 81.0 | 81.5 | 87.4 | 89.8 |
| 7. | S stage 1, $ft^2/(Nm^3/h)$ | 20.25 | 22.98 | 25.59 | 20.12 | 16.75 | 14.59 |
| 8. | S stage 2, $ft^2/(Nm^3/h)$ | 12.72 | 13.79 | 14.84 | 7.92 | 9.23 | 10.29 |
| 9. | S stage 3, $ft^2/(Nm^3/h)$ | 32.84 | 21.06 | 16.47 | 15.16 | 16.84 | 19.70 |
| 10. | Biogas utilization square, $ft^2/(Nm^3/h)$ | 65.81 | 57.83 | 56.90 | 43.20 | 42.82 | 44.58 |
| 11. | W compressor 1, kW | 232.8 | 238.0 | 246 | 202.6 | 202.1 | 204.7 |
| 12. | W compressor 2, kW | — | — | — | 38.7 | 36.1 | 33.1 |
| 13. | Biogas utilization electric energy, $kWh/Nm^3$ | 0.233 | 0.238 | 0.246 | 0.241 | 0.238 | 0.238 |
| 14. | Combined recycle to inlet flow ratio, % | 40.69 | 44.0 | 48.98 | 22.12 | 21.83 | 23.49 |
| 15. | Biomethane $CH_4$, % mol. | 95.44 | 95.47 | 95.48 | 95.41 | 95.44 | 95.45 |
| 16. | Biomethane $N_2$, % mol. | 2.60 | 2.60 | 2.60 | 2.61 | 2.61 | 2.60 |
| 17. | Biomethane $O_2$, % mol. | 0.2779 | 0.2621 | 0.2540 | 0.2992 | 0.2816 | 0.2779 |
| 18. | Biomethane $H_2S$, % mol. | 0.1762 | 0.1675 | 0.1629 | 0.1847 | 0.1746 | 0.1727 |

*pressure decreased to avoid of very high stage cut for membrane separation unit 3.

identical properties in respective stages to generate comparable results. High selectivity membranes were used in the 1st and 3rd membrane separation stages and high gas processing capacity membranes with a lower selectivity and Examples of generating the RNG product with $CO_2$ product purity of 1.5% mole and 99.5% methane recovery by the method of instant invention (with reference to FIG. 2) are summarized in Table 1 columns 4,5 and 6 (process variants 1,2 and 3). Comparative Examples based on the prior art method (process configuration FIG. 1) are also provided in Table 1 columns 1, 2 and 3 (Variants 1,2 and 3). The pressure of the first effluent stream directed into the first membrane separation unit in all cases is 13.5 barg. The RNG product gas with a carbon dioxide concentration of 1.5% mole is generated at an identical methane recovery of 99.5% and comparable energy consumption by the method of instant invention with more than 30% reduction in the overall membrane gas processing capacity (more than 30% reduction in the membrane surface area for polymeric membranes with identical gas permeance) as compared to the prior art process. It was found surprisingly that the attainment of the target purity and recovery combination is possible with the optimal second effluent stream carbon dioxide concentration maintained between 6 and 101% mole.

design options provided by the method of the invention wherein the compression energy consumption can be reduced by decreasing the feed gas level of compression with a concomitant increase in the required membrane gas processing capacity (an increase in the membrane surface area for membranes with identical gas permeance). The compression energy consumption is decreased by about 7% and is also lower as compared to the prior art process (columns Var.3 and Var.4 in Table 2 as compared to Var.1 and Var.2 in Table 1). Further reduction in energy consumption is possible by increasing the membrane gas processing capacity. The increase in the carbon dioxide concentration of the second effluent stream directed into the second membrane separation unit is required to attain the target product recovery as the feed gas pressure is reduced. The increase is driven by the need to maintain the carbon dioxide concen-

TABLE 2

| Table 2 No | Design Parameter | 3-stage 2 compressors FIG. 2 Var. 1 | 3-stage 2 compressors FIG.2 Var.2 | 3-stage 2 compressors FIG. 2 Var.3 | 3-stage 2 compressors FIG. 2 Var.4 | 3-stage 2 compressors FIG.2 Var.5 | 3-stage 2 compressors FIG. 2 Var.6 |
|---|---|---|---|---|---|---|---|
| 1. | Biomethane target $CO_2$, % mole | 1.5 | 1.5 | 1.5 | 1.5 | 1.5 | 1.5 |
| 2. | $CO_2$ content after stage 1, % mole | 12.0 | 14.0 | 10.0 | 12.0 | 8.0 | 10.0 |
| 3. | Pressure before stage 1, barg | 7.5 | 7.5 | 9.5 | 9.5 | 11.5 | 11.5 |
| 4. | Pressure before stage 3, barg | 3.3 | 3.3 | 3.3 | 3.3 | 3.3 | 3.3 |
| 5. | Stage cut %, stage 1 | 38.94 | 36.6 | 39.95 | 37.74 | 41.56 | 39.15 |
| 6. | Stage cut %, stage 2 | 33.77 | 36.31 | 28.24 | 31.06 | 23.17 | 26.35 |
| 7. | Stage cut %, stage 3 | 80.0 | 85.0 | 83.0 | 87.5 | 83.0 | 89.8 |
| 8. | S stage 1, $ft^2/(Nm^3/h)$ | 34.2 | 29.68 | 25.64 | 22.20 | 21.74 | 18.56 |
| 9. | S stage 2, $ft^2/(Nm^3/h)$ | 28.04 | 29.86 | 17.60 | 19.03 | 11.76 | 13.05 |
| 10. | S stage 3, $ft^2/(Nm^3/h)$ | 15.11 | 15.98 | 15.54 | 16.89 | 15.45 | 17.16 |
| 11. | Biogas utilization square, $ft^2/(Nm^3/h)$ | 77.35 | 75.52 | 58.78 | 58.12 | 48.95 | 48.77 |
| 12. | W compressor 1, kW | 175.0 | 175.2 | 184.4 | 185.2 | 193.8 | 194.0 |
| 13. | W compressor 2, kW | 39.6 | 37.2 | 38.1 | 36.1 | 37.3 | 35.9 |
| 14. | Biogas utilization electric energy, $kWh/Nm^3$ | 0.215 | 0.212 | 0.223 | 0.221 | 0.231 | 0.230 |
| 15. | Combined recycle to inlet flow ratio, % | 39.34 | 39.54 | 30.87 | 31.39 | 25.82 | 25.92 |
| 16. | Biomethane $CH_4$, % mol. | 95.48 | 95.50 | 95.46 | 95.48 | 95.44 | 95.46 |
| 17. | Biomethane $N_2$, % mol. | 2.60 | 2.60 | 2.60 | 2.60 | 2.61 | 2.60 |
| 18. | Biomethane $O_2$, % mol. | 0.2539 | 0.2468 | 0.2652 | 0.2570 | 0.2810 | 0.2685 |
| 19. | Biomethane $H_2S$, % mol. | 0.1612 | 0.1568 | 0.1670 | 0.1619 | 0.1754 | 0.1677 |

Generation of the RNG with $CO_2$ product purity of 1.5% mole and 99.5% methane recovery by the method of instant invention at different feed gas pressures of the first effluent stream directed into the first membrane separation unit is shown in Table 2. The Examples demonstrate the flexible tration of the third permeate effluent stream at a high enough level to provide 99.5% of $CH_4$ recovery of the third membrane stage wherein the separation efficiency of the first membrane stage is affected by a decrease in the feed gas to permeate pressure ratio.

TABLE 3

| Table 3 No | Design Parameter | 3-stage 1 compressor FIG. 1 Var. 1 | 3-stage 1 compressor FIG.1 Var.2 | 3-stage 1 compressor FIG. 1 Var.3 | 3-stage 2 compressors FIG. 2 Var. 1 | 3-stage 2 compressors FIG. 2 Var.2 | 3-stage 2 compressors FIG. 2 Var.3 |
|---|---|---|---|---|---|---|---|
| 1. | Biomethane target $CO_2$ purity % mole | 0.1 | 0.1 | 0.1 | 0.1 | 0.1 | 0.1 |
| 2. | $CO_2$ content after stage 1, % mole | 16.0* | 16.0* | 16.0* | 8.0 | 10.0 | 12.0 |
| 3. | Pressure before stage 3, barg | 1.6 | 2.5 | 3.3 | 3.3 | 3.3 | 3.3 |
| 4. | Stage cut %, stage 1 | 38.32 | 40.23 | 45.16 | 37.92 | 35.57 | 33.97 |
| 5. | Stage cut %, stage 2 | 45.38 | 45.41 | 45.18 | 37.39 | 39.74 | 41.82 |

TABLE 3-continued

| Table 3 No | Design Parameter | 3-stage 1 compressor FIG. 1 Var. 1 | 3-stage 1 compressor FIG.1 Var.2 | 3-stage 1 compressor FIG. 1 Var.3 | 3-stage 2 compressors FIG. 2 Var. 1 | 3-stage 2 compressors FIG. 2 Var.2 | 3-stage 2 compressors FIG. 2 Var.3 |
|---|---|---|---|---|---|---|---|
| 6. | Stage cut %, stage 3 | 70.26 | 64,82 | 53.2 | 81.9 | 87.2 | 90.4 |
| 7. | S stage 1, ft$^2$/(Nm$^3$/h) | 23.07 | 32,18 | 53.77 | 19.16 | 16.31 | 14.31 |
| 8. | S stage 2, ft$^2$/(Nm$^3$/h) | 26.28 | 26.28 | 26.28 | 22.13 | 23.22 | 24.26 |
| 9. | S stage 3, ft$^2$/(Nm$^3$/h) | 33.68 | 22,85 | 15.61 | 15.75 | 17.26 | 19.95 |
| 10. | Biogas utilization square, ft$^2$/(Nm$^3$/h) | 83.03 | 81,31 | 95.66 | 57.04 | 56.79 | 58.52 |
| 11. | W compressor 1, kW | 271.6 | 280.0 | 302.9 | 236.0 | 236.3 | 238.6 |
| 12. | W compressor 2, kW | — | — | — | 39.4 | 37.0 | 35.7 |
| 13. | Biogas utilization electric energy, kWh/Nm$^3$ | 0.272 | 0.283 | 0.303 | 0.275 | 0.273 | 0.274 |
| 14. | Combined recycle to inlet flow ratio, % | 64.4 | 71.8 | 84.14 | 42.62 | 42.79 | 44.25 |
| 15. | Biomethane CH$_4$, % mol. | 97.09 | 97.10 | 97.08 | 97.09 | 97.10 | 97.11 |
| 16. | Biomethane N$_2$, % mol. | 2.63 | 2.62 | 2.63 | 2.62 | 2.62 | 2.62 |
| 17. | Biomethane O$_2$, % mol. | 0.1032 | 0.1005 | 0.1064 | 0.1038 | 0.0994 | 0.0973 |
| 18. | Biomethane H$_2$S, % mol. | 0.0814 | 0.0795 | 0.0835 | 0.0800 | 0.0765 | 0.0746 |

*the recovery of 99.5% is difficult to meet by the process configuration if the CO$_2$ content after 1st stage is lower than indicated. The CO$_2$ concentration reduction ratio from the feed gas CO$_2$ composition to the retentate CO$_2$ gas composition by the membrane gas separation unit 2 is 160. The high concentration ratio reduction requires membranes of exceptionally high quality without defects and perfect flow dynamics.

The generation of high purity RNG product by the method of the instant invention (with reference to process configuration in FIG. 2) is compared to the prior art method (with reference to process configuration in FIG. 1) in Table 3. Columns 4,5 and 6 provide Examples of the RNG gas product generation by the method of the invention while columns 1,2 and 3 are comparative Examples by the method of prior art. The pressure of the first effluent stream directed into the first membrane separation unit in all cases is 13.5 barg. The high purity RNG gas product with carbon dioxide concentration of 0.1% mole is generated at an identical methane recovery of 99.5% and comparable energy consumption by the method of instant invention with more than 40% reduction in the overall membrane gas processing capacity (more than 40% reduction in the membrane surface area for polymeric membranes with identical gas permeance). The prior art process design further generates a constrain that imposes a requirement for the gas composition of the second effluent stream directed as a feed into the second membrane separation unit. The carbon dioxide concentration must be maintained at 16% or higher to meet product purity and recovery specification. The method of instant invention provides for the attainment of target product purity and recovery with a flexible and lower concentration of carbon dioxide in the second effluent stream.

TABLE 4

| Table 4 No | Design Parameter | 3-stage 2 compressors FIG. 3 Var. 1 | 3-stage 2 compressors FIG. 3 Var. 2 | 3-stage 2 compressors FIG. 3 Var.3 | 3-stage 2 compressors FIG. 3 Var.4 | 3-stage 2 compressors FIG. 3 Var.5 |
|---|---|---|---|---|---|---|
| 1. | Biomethane target CO$_2$ purity % mole | 0.005 | 0.005 | 0.005 | 0.005 | 0.005 |
| 2. | CO$_2$ content after stage 1, % mole | 10.0 | 10.0 | 10.0 | 10.0 | 10.0 |
| 3. | Stage cut %, stage 1 | 33.29 | 33.12 | 32.96 | 32.89 | 32.74 |
| 4. | Stage cut %, stage 2.1 | 42.92 | 38.97 | 35.01 | 30.99 | 26.67 |
| 5. | Stage cut %, stage 2.2 | 9.34 | 15.89 | 21.50 | 26.40 | 31.46 |
| 6. | Stage cut %, stage 3 | 83.3 | 83.3 | 83.3 | 83.3 | 83.0 |
| 7. | S stage 1, ft$^2$/(Nm$^3$/h) | 17.79 | 17.86 | 17.90 | 17.94 | 18.05 |
| 8. | S stage 2.1, ft$^2$/(Nm$^3$/h) | 28.8 | 25.2 | 21.60 | 18.00 | 14.4 |
| 9. | S stage 2.2, ft$^2$/(Nm$^3$/h) | 5.44 | 9.84 | 14.08 | 18.20 | 23.07 |
| 10. | S stage 3, ft$^2$/(Nm$^3$/h) | 16.14 | 16.19 | 16.22 | 16.25 | 16.19 |
| 11. | Biogas utilization square, ft$^2$/(Nm$^3$/h) | 68.17 | 69.09 | 69.80 | 70.39 | 71.71 |
| 12. | W compressor 1, kW | 265.0 | 266.4 | 267.4 | 268.2 | 270.5 |
| 13. | W compressor 2, kW | 38.9 | 38.9 | 38.9 | 38.9 | 39.1 |
| 14. | Biogas utilization electric energy, kWh/Nm$^3$ | 0.304 | 0.305 | 0.306 | 0.307 | 0.310 |
| 15. | Main recycle to inlet flow ratio, % | 60.10 | 60.95 | 61.60 | 62.08 | 63.42 |
| 16. | Biomethane CH$_4$, % mol. | 97.33 | 97.33 | 97.33 | 97.33 | 97.34 |
| 17. | Biomethane N$_2$, % mol. | 2.61 | 2.61 | 2.60 | 2.60 | 2.60 |
| 18. | Biomethane O$_2$, % mol. | 0.0311 | 0.0304 | 0.0300 | 0.0298 | 0.0281 |
| 19. | Biomethane H$_2$S, % mol. | 0.0300 | 0.0294 | 0.0290 | 0.0288 | 0.0275 |

The multiple advantages of the method of the instant invention are demonstrated by the Examples summarized in Tabe 4 with reference to the process design configuration in FIG. 3A. The high purity RNG product with a carbon dioxide concentration of 0.005% mole is generated. In the Examples shown the feed gas pressure of the first effluent stream directed into the first membrane separation unit in all cases was 13.5 barg and the pressure of the effluent stream directed into the third membrane separation unit was 3.3 barg. The second membrane separation unit consisted of two membrane modules 2.1 and 2.2 arranged in series. The permeate gas stream generated by the second membrane module 2.2 in the two-series module sequence was used as a sweep gas on the permeate side of the first membrane module 2.1. The energy efficiency of the method of the invention is increased by optimizing the gas processing capacity split between modules 2.1 and 2.2. The compression energy consumption is reduced while the overall required membrane area of the multi-stage membrane system is also decreased as the gas processing capacity of membrane module 2.1 is increased as compared to module 2.2. The membrane gas processing capacity for modules 2.1 and 2.2 is proportional to the membrane surface area directly since the membrane modules were equipped with polymeric membranes of identical gas permeance for all gas components. It is possible to reduce the concentration of oxygen and hydrogen sulfide in the product stream by optimizing the gas processing capacity ratio between modules 2.2 and 2.1. The method provides for the ability to optimize site-specific project economics based on the tradeoff between energy consumption and capital costs. To affect site-specific process economics or in-depth concentration reduction of specific contaminants, the modules can be equipped with polymeric membranes that differ in gas separation characteristics in addition to optimizing the gas processing capacity ratio between modules 2.1. and 2.2.

The method of the instant invention is advantageous as compared to the prior art three-stage system. The gas processing membrane capacity (biogas utilization, i.e. the required membrane surface area per unit gas product volume generated) is reduced, and/or the compression energy consumption (kW, amount of energy required to generate the unit volume of product) is decreased to generate the product of identical purity with 99.5% recovery. The prior art 3-stage system required a much larger membrane surface area and/or consume more power to generate an identical product. The three-stage system of the instant invention afforded improved levels of other impurities reduction (02 and H$_2$S) in addition to carbon dioxide removal to very low concentrations.

The present invention is described with reference to Figures and a number of embodiments, which should not be construed as limiting the present invention.

The invention claimed is:

1. A method of generating a high-purity hydrocarbon stream from a raw biogas feed stream comprised of methane, carbon dioxide, nitrogen, oxygen, water vapor, and hydrogen sulfide available at a substantially atmospheric pressure, said method comprising the steps of:
    (i) compressing said raw biogas feed stream mixed with recycled permeate gas streams and a recycled retentate gas stream in a first compressor, thereby forming a first effluent stream;
    (ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream;
    (iii) passing the retentate second effluent stream to a second membrane separation unit, wherein the second membrane separation unit removes a portion of carbon dioxide, hydrogen sulfide, water vapor, and oxygen from the retentate second effluent stream, thereby forming a retentate fourth effluent stream having a lower carbon dioxide, hydrogen sulfide, water vapor, and oxygen content as compared to the retentate second effluent stream and a permeate fifth effluent stream enriched in carbon dioxide, hydrogen sulfide, water vapor, and oxygen content as compared to the retentate second effluent stream;
    (iv) compressing said permeate third effluent stream in a second compressor, thus forming a sixth effluent stream;
    (v) passing the sixth effluent stream to a third membrane separation unit, wherein the third membrane separation unit removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the raw biogas feed stream and a permeate seventh effluent stream enriched in carbon dioxide, hydrogen sulfide, water vapor and oxygen as compared to the sixth effluent stream;
    (vi) passing said retentate eighth effluent stream to a front end of the first compressor, wherein the retentate eighth effluent stream defines the recycled retentate gas stream that is mixed with said raw biogas feed stream in step (i);
    (vii) passing the retentate fourth effluent stream to a fourth membrane separation unit, wherein the fourth membrane separation unit removes a portion of carbon dioxide, hydrogen sulfide, water vapor, and oxygen from the retentate fourth effluent stream, thereby forming a retentate tenth effluent stream having a lower carbon dioxide, hydrogen sulfide, oxygen and water vapor content as compared to the raw biogas feed stream and a permeate ninth effluent stream with increased carbon dioxide content as compared to the retentate fourth effluent stream;
    (viii) passing said permeate fifth effluent stream and said permeate ninth effluent stream to a front end of the first compressor, wherein the combined permeate fifth effluent stream and permeate ninth effluent stream defines the recycled permeate gas streams that are mixed with said raw biogas feed stream in step (i);
    (ix) collecting the retentate tenth effluent stream generated by the fourth membrane separation unit as a high-purity hydrocarbon product, wherein the retentate tenth effluent stream has an increased methane content and reduced hydrogen sulfide, oxygen, and carbon dioxide content as compared to the raw biogas feed stream; and
    (x) wherein a deoxygenation unit is disposed between the second and the fourth membrane separation units to remove oxygen from the fourth retentate effluent stream.

2. The method of claim 1 wherein said permeate ninth effluent stream is used as a sweep gas on a permeate side of the second membrane separation unit, combined with the fifth permeate effluent stream and recycled to the front end of the first compressor in step (i) to form the recycled permeate gas streams.

3. The method of claim 1 wherein said raw feed gas stream mixed with the recycled permeate gas streams and the recycled retentate gas stream is compressed in the first compressor to a pressure from 6 to 25 barg, and wherein said permeate third effluent stream is compressed in the second compressor to a pressure from 2 to 6 barg.

4. The method of claim 2 wherein said raw feed gas stream mixed with the recycled permeate gas streams and the recycled retentate gas stream is compressed in the first compressor to a pressure from 6 to 25 barg, and wherein said permeate third effluent stream is compressed in the second compressor to a pressure from 2 to 6 barg.

5. The method of claim 4 wherein said permeate third effluent stream is removed from the first membrane separation unit at substantially atmospheric pressure or a sub-atmospheric pressure.

6. The method of claim 1 wherein said a permeate seventh effluent stream has a carbon dioxide concentration above 95 volumetric percent, and wherein the permeate seventh effluent stream is at substantially atmospheric pressure or a sub-atmospheric pressure.

7. The method of claim 2 wherein said a permeate seventh effluent stream has a carbon dioxide concentration above 95 volumetric percent, and wherein the permeate seventh effluent stream is at substantially atmospheric pressure or a sub-atmospheric pressure.

8. The method of claim 1 wherein said permeate seventh effluent stream is removed from said third membrane separation unit at substantially atmospheric pressure or a sub-atmospheric pressure.

9. The method of claim 1 further comprising the step of collecting the permeate seventh effluent stream generated by the third membrane separation unit as a product.

10. The method of claim 2 further comprising the step of collecting the permeate seventh effluent stream generated by the third membrane separation unit as a product.

11. The method of claim 1 wherein the retentate tenth effluent stream is treated in an adsorption unit to remove additional hydrogen sulfide.

12. The method of claim 2 wherein the retentate tenth effluent stream is treated in an adsorption unit to remove additional hydrogen sulfide.

13. The method of claim 12 wherein an adsorbent in the adsorption unit comprises an activated carbon.

14. The method of claim 1 wherein a combined volume of the recycled permeate gas streams and the recycled retentate gas stream, mixed with said raw biogas feed stream in step (i), is from 20 to 40 percent of a volume of said raw biogas feed stream for a standard biomethane product purity with carbon dioxide concentration between b 2.0 and 0.2% mole and from 35 to 75 percent for a high biomethane product purity in the retentate tenth effluent stream with carbon dioxide purity below 0.2% mole.

15. The method of claim 1 wherein the first membrane separation unit, the third membrane separation unit, and the fourth membrane separation unit are equipped with semi-permeable polymeric hollow fiber membranes exhibiting a $CO_2/CH_4$ gas separation factor above 40, and the second membrane separation unit is equipped with semipermeable polymeric hollow fiber membranes exhibiting a $CO_2/CH_4$ gas separation factor above 20.

16. The method of claim 1 wherein a total gas processing capacity of gas separation membranes in the second and fourth membrane separation units is higher than a total gas processing capacity of the gas separation membranes in the first membrane separation unit, the total capacity being measured by permeating Grade 4.8 nitrogen under standard conditions as defined in the description.

17. The method of claim 1 wherein the first, second, third, and fourth membrane separation units are equipped with semipermeable polymeric hollow fiber membranes exhibiting a hydrogen sulfide/methane separation factor above 9 and an oxygen/methane separation factor above 5.

18. The method of claim 17 wherein the first, second, third, and fourth membrane separation units are equipped with semipermeable polymeric hollow fiber membranes exhibiting a hydrogen sulfide/methane separation factor above 20 and an oxygen/methane separation factor above 7.

19. The method of claim 1 wherein a residual oxygen concentration in the fourth retentate effluent stream is reduced by more than 50% as compared to an oxygen concentration in the raw biogas feed stream.

20. The method of claim 1 wherein at least one of the first, second, third, and fourth membrane separation units is equipped with semipermeable polymeric hollow fiber membranes that differ in gas separation characteristics as compared to membranes equipped in others of the first, second, third, and fourth separation units.

21. The method of claim 2 wherein a vacuum pump is disposed on the permeate seventh effluent stream to collect the permeate seventh effluent stream at a sub-atmospheric pressure.

22. The method of claim 11 wherein the retentate tenth effluent stream is treated to remove nitrogen in a cryogenic or adsorption-based nitrogen rejection unit.

23. The method of claim 22 wherein a nitrogen reject stream generated by the cryogenic or the adsorption-based nitrogen rejection unit is used to regenerate the adsorption unit or a sweep gas on the permeate side of the third membrane separation unit.

24. The method of claim 12 wherein the retentate tenth effluent stream is treated to remove nitrogen in a cryogenic or adsorption-based nitrogen rejection unit.

25. The method of claim 24 wherein a nitrogen reject stream generated by the cryogenic or the adsorption-based nitrogen rejection unit is used to regenerate the adsorption unit or a sweep gas on the permeate side of the third membrane separation unit.

26. The method of claim 1 wherein the raw biogas feed stream or the first effluent stream or both are treated to remove volatile organic compounds (VOCs) and to reduce water vapor content upstream of the first membrane separation unit.

27. The method of claim 1 wherein the raw biogas feed stream is treated in a biological hydrogen sulfide removal unit before being combined with the recycled permeate gas streams and the recycled retentate gas stream.

28. The method of claim 1 wherein the permeate seventh effluent stream is treated to remove hydrogen sulfide.

29. The method of claim 28 wherein the hydrogen sulfide is removed in a biological hydrogen sulfide removal unit.

30. The method of claim 1 further comprising an adsorption unit that removes contaminants from the retentate fourth effluent stream.

31. The method of claim 1 wherein the first compressor compresses said raw biogas feed gas stream, the recycled permeate gas streams, and the recycled retentate gas stream to a pressure from 10 to 16 barg, followed by aftercooling and condensate separation, thereby forming the first effluent stream and the permeate third effluent stream is compressed by the second compressor to a pressure from 3 to 4 barg.

32. The method of claim 1 wherein the retentate tenth effluent stream has a carbon dioxide concentration below 2% mole, wherein the retentate second effluent stream has a carbon dioxide concentration between 14 and 4% mole, and an overall methane recovery by the method is above 99%.

33. The method of claim 32 wherein the retentate second effluent stream has a carbon dioxide concentration between 12 and 8% mole.

34. The method of claim 32 wherein the retentate tenth effluent stream has a carbon dioxide concentration below 500 ppm, and an overall methane recovery by the method is above 99%.

35. The method of claim 34 wherein the retentate tenth effluent stream has a carbon dioxide concentration below 50 ppm, and the overall methane recovery by the method is above 99%.

36. An apparatus for generating a high-purity hydrocarbon stream from a raw biogas feed stream comprised of methane, carbon dioxide, nitrogen, oxygen, water vapor and hydrogen sulfide available at a substantially atmospheric pressure, said apparatus comprising:
(i) a first compressor that compresses said raw feed gas stream mixed with recycled permeate gas streams and a recycled retentate gas stream, thereby forming a first effluent stream;
(ii) a first membrane separation unit that receives the first effluent stream, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream;
(iii) a second membrane separation unit that receives the retentate second effluent stream, wherein the second membrane separation unit removes a portion of carbon dioxide, hydrogen sulfide, water vapor, and oxygen from the retentate second effluent stream, thereby forming a retentate fourth effluent stream having a lower carbon dioxide, hydrogen sulfide, water vapor, and oxygen content as compared to the retentate second effluent stream and a permeate fifth effluent stream enriched in carbon dioxide, hydrogen sulfide, water vapor, and oxygen content as compared to the retentate second effluent stream;
(iv) a second compressor that compresses said permeate third effluent stream, thus forming a sixth effluent stream;
(v) a third membrane separation unit that receives the sixth effluent stream, wherein the third membrane separation unit removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the raw biogas feed stream and a permeate seventh effluent stream enriched in carbon dioxide, hydrogen sulfide, water vapor, and oxygen as compared to the sixth effluent stream;
(vi) wherein said retentate eighth effluent stream is passed to a front end of the first compressor, wherein the retentate eighth effluent stream defines the recycled retentate gas stream that is mixed with said raw biogas feed gas stream in step (i);
(vii) a fourth membrane separation unit that receives the retentate fourth effluent stream, wherein the fourth membrane separation unit removes a portion of carbon dioxide, hydrogen sulfide, water vapor, and oxygen from the retentate fourth effluent stream, thereby forming a retentate tenth effluent stream having a lower carbon dioxide, hydrogen sulfide, oxygen and water vapor content as compared to the raw biogas feed stream and a permeate ninth effluent stream with increased carbon dioxide content as compared to the retentate fourth effluent stream;
(viii) wherein said permeate fifth effluent stream and said permeate ninth effluent stream are passed to a front end of the first compressor, wherein the combined permeate fifth effluent stream and permeate ninth effluent stream define the recycled permeate gas streams that are mixed with said raw biogas feed stream in step (i);
(ix) wherein the retentate tenth effluent stream generated by the fourth membrane separation unit is collected as a high-purity hydrocarbon product, wherein the retentate tenth effluent stream has an increased methane content and reduced hydrogen sulfide, oxygen, and carbon dioxide content as compared to the raw biogas feed stream; and
(x) wherein a deoxygenation unit is disposed between the second and the fourth membrane separation units to remove oxygen from the fourth retentate effluent stream.

37. The apparatus of claim 36 wherein said permeate ninth effluent stream is used as a sweep gas on a permeate side of the second membrane separation unit.

38. The apparatus of claim 37 wherein said raw feed gas stream mixed with a recycled permeate gas streams and a recycled retentate gas stream is compressed in the first compressor to a pressure from 6 to 25 barg and said permeate third effluent stream is compressed in the second compressor to a pressure from 2 to 6 barg.

39. The apparatus of claim 37 wherein said permeate third effluent stream is removed from the first membrane separation unit at substantially atmospheric pressure or a sub-atmospheric pressure.

40. The apparatus of claim 37 wherein said a permeate seventh effluent stream has a carbon dioxide concentration above 95 volumetric percent, and wherein the permeate seventh effluent stream is at substantially atmospheric pressure or a sub-atmospheric pressure.

41. The apparatus of claim 36 wherein the permeate seventh effluent stream generated by the third membrane separation unit is collected as a product.

42. The apparatus of claim 37 wherein the retentate tenth effluent stream is treated in an adsorption unit to remove additional hydrogen sulfide.

43. The apparatus of claim 37 wherein the retentate tenth effluent stream is treated to remove nitrogen in a cryogenic or adsorption-based nitrogen rejection unit.

44. The apparatus of claim 43 wherein a nitrogen reject stream generated by the cryogenic or the adsorption-based nitrogen rejection unit is used to regenerate the adsorption unit or a sweep gas on the permeate side of the third membrane separation unit.

45. The apparatus of claim 36 wherein a combined volume of the recycled permeate gas streams and the recycled retentate gas stream, mixed with said raw biogas feed stream in step (i), is from 20 to 40 percent of the volume of the said raw biogas feed stream for a standard biomethane product purity with carbon dioxide concentration between 2.0 and 0.2% mole and from 35 to 75 percent for a high biomethane product purity in the retentate tenth effluent stream with carbon dioxide purity below 0.2% mole.

46. The apparatus of claim 36 wherein the first membrane separation unit, the third membrane separation unit, and the fourth membrane separation unit are equipped with semipermeable polymeric hollow fiber membranes exhibiting a $CO_2/CH_4$ gas separation factor above 40, and the second membrane separation unit is equipped with semipermeable polymeric hollow fiber membranes exhibiting a $CO_2/CH_4$ gas separation factor above 20.

47. The apparatus of claim 36 wherein a total gas processing capacity of gas separation membranes in the second and fourth membrane separation units is higher than a total gas processing capacity of the gas separation membranes in the first membrane separation unit, the total capacity being measured by permeating Grade 4.8 nitrogen under standard conditions as defined in the description.

48. The apparatus of claim 36 wherein the first, second, third, and fourth membrane separation units are equipped with semipermeable polymeric hollow fiber membranes exhibiting a hydrogen sulfide/methane separation factor above 9 and an oxygen/methane separation factor above 5.

49. The apparatus of claim 48 wherein the first, second, third, and fourth membrane separation units are equipped with semipermeable polymeric hollow fiber membranes exhibiting a hydrogen sulfide/methane separation factor above 20 and an oxygen/methane separation factor above 7.

50. The apparatus of claim 36 wherein a residual oxygen concentration in the fourth retentate effluent stream is reduced by more than 50% as compared to an oxygen concentration in the raw biogas feed stream.

51. The apparatus of claim 36 wherein at least one of the first, second, third, and fourth membrane separation units is equipped with semipermeable polymeric hollow fiber membranes that differ in gas separation characteristics as compared to membranes equipped in others of the first, second, third, and fourth membrane separation units.

52. The apparatus of claim 37 wherein a vacuum pump is disposed on the permeate seventh effluent stream to collect the permeate seventh effluent stream at a sub-atmospheric pressure.

53. The apparatus of claim 36 wherein the retentate tenth effluent stream is treated in an adsorption unit to remove additional hydrogen sulfide followed by nitrogen removal in a cryogenic or adsorption-based nitrogen rejection unit.

54. The apparatus of claim 36 wherein the raw biogas feed stream or the first effluent stream or both are treated to remove volatile organic compounds (VOCs) and to reduce water vapor content upstream of the first membrane separation unit.

55. The apparatus of claim 36 wherein the first compressor compresses said raw biogas feed gas stream, the recycled permeate gas streams, and the recycled retentate gas stream to a pressure from 10 to 16 barg, followed by aftercooling and condensate separation, thereby forming the first effluent stream and wherein the permeate third effluent stream is compressed by the second compressor in step (iv) to a pressure from 3 to 4 barg.

56. The apparatus of claim 36 wherein the permeate seventh effluent stream is treated to remove hydrogen sulfide.

57. The apparatus of claim 36 wherein the hydrogen sulfide is removed from the raw biogas feed stream in a biological hydrogen sulfide removal unit.

58. The apparatus of claim 36 wherein the retentate tenth effluent stream has a carbon dioxide concentration below 2% mole, wherein the retentate second effluent stream has a carbon dioxide concentration between 14 and 4% mole, and an overall methane recovery by the apparatus is above 99%.

59. The apparatus of claim 58 wherein the retentate second effluent stream has a carbon dioxide concentration between 12 and 8% mole.

60. The apparatus of claim 55 wherein the retentate tenth effluent stream has a carbon dioxide concentration below 500 ppm, and an overall methane recovery by the apparatus is above 99%.

61. The apparatus of claim 60 wherein the retentate tenth effluent stream has a carbon dioxide concentration below 50 ppm, and the overall methane recovery by the apparatus is above 99%.

62. A method of generating a high-purity hydrocarbon stream from a raw biogas feed stream comprised of methane, carbon dioxide, nitrogen, oxygen, water vapor, and hydrogen sulfide available at a substantially atmospheric pressure, said method comprising the steps of:
(i) compressing said raw biogas feed stream mixed with recycled permeate gas streams and a recycled retentate gas stream in a first compressor, thereby forming a first effluent stream;
(ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream;
(iii) passing the retentate second effluent stream to a second membrane separation unit, wherein the second membrane separation unit removes a portion of carbon dioxide, hydrogen sulfide, water vapor, and oxygen from the retentate second effluent stream, thereby forming a retentate fourth effluent stream having a lower carbon dioxide, hydrogen sulfide, water vapor, and oxygen content as compared to the retentate second effluent stream and a permeate fifth effluent stream enriched in carbon dioxide, hydrogen sulfide, water vapor, and oxygen content as compared to the retentate second effluent stream;
(iv) passing the permeate third effluent stream to a third membrane separation unit, wherein the third membrane separation unit removes a portion of carbon dioxide, hydrogen sulfide, water vapor, and oxygen from the third effluent stream, thereby forming a retentate sixth effluent stream having a lower carbon dioxide, hydrogen sulfide, and water vapor content as compared to the third effluent stream and a permeate seventh effluent stream enriched in carbon dioxide, hydrogen sulfide, water vapor, and oxygen as compared to the third effluent stream;
(v) passing said retentate sixth effluent stream to a front end of the first compressor, wherein the retentate sixth effluent stream defines the recycled retentate gas stream that is mixed with said raw biogas feed gas stream in step (i);
(vi) passing the retentate fourth effluent stream to a fourth membrane separation unit, wherein the fourth membrane separation unit removes a portion of carbon dioxide, hydrogen sulfide, water vapor, and oxygen from the retentate fourth effluent stream, thereby forming a retentate eighth effluent stream having a lower carbon dioxide, hydrogen sulfide, water vapor and oxygen content as compared to the feed raw biogas stream and a permeate ninth effluent stream with increased carbon dioxide content as compared to the retentate fourth effluent stream;

(vii) passing said permeate fifth effluent stream and said permeate ninth effluent stream to a front end of the first compressor, wherein the combined permeate fifth effluent stream and permeate ninth effluent stream define the recycled permeate gas streams that are mixed with said raw biogas feed gas stream in step (i);

(ix) collecting the retentate eighth effluent stream generated by the fourth membrane separation unit as a high-purity hydrocarbon product, wherein the retentate eighth effluent stream has an increased methane content and reduced hydrogen sulfide, oxygen, water vapor and carbon dioxide content as compared to the raw biogas feed stream; and (x) wherein a deoxygenation unit is disposed between the second and the fourth membrane separation units to remove oxygen from the fourth retentate effluent stream.

63. The method of claim 62 wherein said permeate ninth effluent stream is used as a sweep gas on a permeate side of the second membrane separation unit, combined with the fifth permeate effluent stream and recycled to the front end of the first compressor in step (i) to form the recycled permeate gas streams.

* * * * *